United States Patent
Kato et al.

(10) Patent No.: US 6,181,858 B1
(45) Date of Patent: Jan. 30, 2001

(54) DISPERSION-SHIFTED FIBER

(75) Inventors: Takatoshi Kato; Toshiaki Okuno; Eisuke Sasaoka, all of Yokohama (JP)

(73) Assignee: Sumitomo Electric Industries, Ltd., Osaka (JP)

( * ) Notice: Under 35 U.S.C. 154(b), the term of this patent shall be extended for 0 days.

(21) Appl. No.: 09/022,033

(22) Filed: Feb. 11, 1998

(30) Foreign Application Priority Data

| Feb. 12, 1997 | (JP) | ................................................ | 9-027975 |
| Jul. 4, 1997 | (JP) | ................................................ | 9-179896 |

(51) Int. Cl.[7] .................................................... G02B 6/16

(52) U.S. Cl. ........................ 385/123; 385/124; 385/127

(58) Field of Search .................................... 385/123–128

(56) References Cited

U.S. PATENT DOCUMENTS

| 4,755,022 | 7/1988 | Ohashi et al. | 385/127 |
| 4,852,968 | 8/1989 | Reed | 385/127 |
| 5,327,516 | 7/1994 | Chraplyvy et al. | 385/127 |
| 5,483,612 | 1/1996 | Gallagher et al. | 385/127 |
| 5,553,185 | 9/1996 | Antos et al. | 385/127 |
| 5,781,684 | * 7/1998 | Liu | 385/124 |
| 5,822,488 | * 10/1998 | Terasawa et al. | 385/127 |
| 5,835,655 | * 11/1998 | Liu et al. | 385/124 |

FOREIGN PATENT DOCUMENTS

| 0 724 171 A2 | 7/1996 | (EP) . |
| 51-133041 | 11/1976 | (JP) . |
| 63-43107 | 2/1988 | (JP) . |
| 2-141704 | 5/1990 | (JP) . |
| 3-18161 | 3/1991 | (JP) . |
| 7-168046 | 7/1995 | (JP) . |
| 8-220362 | 8/1996 | (JP) . |
| 8-248251 | 9/1996 | (JP) . |
| 9-33744 | 2/1997 | (JP) . |
| 96/07942 | 3/1996 | (WO) . |

OTHER PUBLICATIONS

Bhagavatula et al. "Dispersion–shifted single–mode fiber for high–bit–rate and multiwavelength systems" OFC 95 Technical Digest, pp. 259–260 (1995).

Nouchi et al. New Dispersion Shifted Fiber With Effective Area Larger Than 90 UM$^2$, 22$^{nd}$ European Conference on Optical Communication—ECOC'96, Oslo, pp. 1.49–1.52 (1996).

Liu et al. "Large Effective Area Dispersion–Shifted Fibers With Dual–Ring Index Profiles" OFC 96 Technical Digest, pp. 165–166 (1996).

Patent Abstract, Gallagher et al., U.S. Patent 5,483,612, issued Jan. 9, 1996.

(List continued on next page.)

*Primary Examiner*—John D. Lee
*Assistant Examiner*—Juliana K. Kang
(74) *Attorney, Agent, or Firm*—Pillsbury Madison & Sutro LLP

(57) ABSTRACT

The present invention provides a dispersion-shifted fiber which can effectively restrain nonlinear optical effects from occurring and is suitable for long-haul transmission. As characteristics at a wavelength of 1,550 nm, this dispersion-shifted fiber has a dispersion whose absolute value is from 1.0 to 4.5 ps/nm/km, an effective core cross-sectional area of at least 70 $\mu m^2$, a cutoff wavelength of at least 1,300 nm at a fiber length of 2 m, and a dispersion slope of 0.05 to 0.09 ps/nm$^2$/km. Also, in this dispersion-shifted fiber, the position where the optical power distribution in the fundamental mode of the signal light is maximized is radially separated from the center of the core region by a predetermined distance, and, when the optical power in the fundamental mode of signal light at the center of core region is $P_0$, and the maximum value of the optical power distribution in the fundamental mode is $P_1$, the maximum value $P_1$ is greater than the value of 1.2 times the optical power $P_0$ at the center of core region.

8 Claims, 16 Drawing Sheets

OTHER PUBLICATIONS

Mahmoud et al: "Transmission Characteristics Of A Coaxial Optical Fiber Line", Journal Of Lightwave Technology, vol. 11, No. 11, Nov. 1993, pp. 1717–1720, XP002016457.

P. Nouchi et al., "Novel Index Profile For Improved Large Effective Area Fiber," International Wire & Cable Symposium Proceedings 1996, pp. 939–945.

* cited by examiner

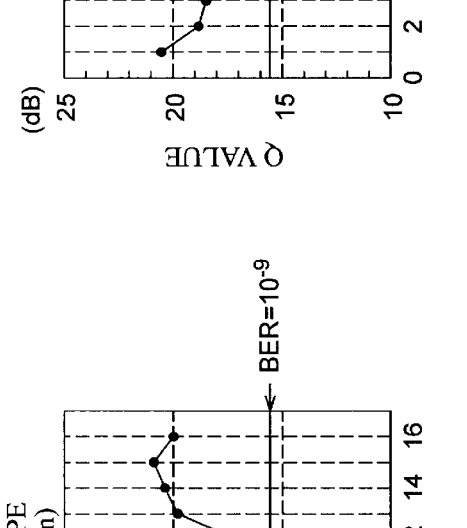
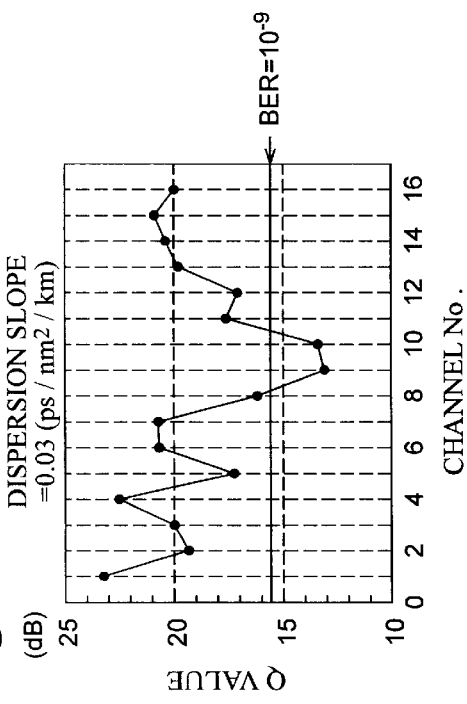

| $\Delta n_2$(%) | 0.4 | 0 | -0.4 | -0.8 |
|---|---|---|---|---|
| $\Delta n_1$(%) | 0.4-2.2 | 1.0-1.8 | 0.8-1.6 | 0.6-1.5 |
| Ra(=2a/2b) | 0.4-0.8 | 0.4-0.8 | 0.4-0.8 | 0.4-0.8 |
| 2b($\mu$m) | 5-14 | 5-14 | 5-14 | 5-14 |

|  | SAMPLE 1 | SAMPLE 2 |
|---|---|---|
| $\Delta n^-$ (%) | -1.00 | -0.40 |
| $\Delta n^+$ (%) | +0.95 | +1.20 |
| Ra (= $\frac{a}{b}$) | 0.53 | 0.65 |
| CORE REGION OUTSIDE DIAMETER b ($\mu$m) | 7.4 | 7.5 |
| ZERO-DISPERSION WAVELENGTH $\lambda_0$ ($\mu$m) | 1.580 | 1.580 |
| DISPERSION SLOPE (ps/nm²/km) | 0.079 | 0.088 |
| EFFECTIVE CORE CROSS-SECTIONAL AREA Aeff ($\mu$m²) | 87 | 86 |
| CUTOFF WAVELENGTH AT 2M ($\mu$m) | 1.5 | 1.7 |
| MFD ($\mu$m) | 11.2 | 11.0 |
| NONLINEAR REFRACTIVE INDEX N2 | 3.63 | 3.7 |
| BENDING LOSS (dB/km) | 0.19 | 0.02 |

CORE REGION

CORE REGION

CORE REGION

DISPERSION-SHIFTED FIBER

BACKGROUND OF THE INVENTION

1. Field of the Invention

The present invention relates to a single-mode optical fiber applied to a transmission line for optical communications or the like and, in particular, to a dispersion-shifted fiber suitable for wavelength division multiplexing (WDM) transmission.

2. Related Background Art

Conventionally, in optical communication systems employing single-mode optical fibers as their transmission lines, light in the wavelength band of 1.3 $\mu$m or 1.55 $\mu$m has often been utilized as signal light for communications. Recently, from the viewpoint of reducing transmission loss in transmission lines, the light in the 1.55-$\mu$m wavelength band has been in use more and more. The single-modeoptical fiber applied to such a transmission line for light in the wavelength band of 1.55 $\mu$m (hereinafter referred to as 1.55-$\mu$m single-mode optical fiber) is designed so as to nullify its wavelength dispersion (phenomenon in which pulse wave broadens because the propagating speed of light varies depending on its wavelength) for light in the wavelength band of 1.55 $\mu$m (thus yielding a dispersion-shifted fiber having a zero-dispersion wavelength of 1.55 $\mu$m). As such a dispersion-shifted fiber, for example, Japanese Patent Publication No. 3-18161 discloses a dispersion-shifted fiber having a refractive index profile of a dual-shape-core structure, whose core region is constituted by an inner core and an outer core having a refractive index lower than that of the inner core. Also, Japanese Patent Application Laid-Open No. 63-43107 and Japanese Patent Application Laid-Open No. 2-141704 disclose a dispersion-shifted fiber having a refractive index profile of a depressed cladding/dual-shape-core structure, whose cladding region is constituted by an inner cladding and an outer cladding having a refractive index greater than that of the inner cladding. Further, V. A. Bhagavatula et al., OFC' 95 Technical Digest, Paper ThH1, 1995, and P. Nouchi et al., ECOC' 96, Paper MoB.3.2, 1996 disclose a dispersion-shifted fiber having a refractive index profile of a ring-shaped core structure.

Recently, on the other hand, since long-haul transmission has become possible with the advent of wavelength division multiplexing (WDM) transmission and optical amplifiers, there have been proposed, in order to avoid nonlinear optical effects, dispersion-shifted fibers employing a refractive index profile of the above-mentioned dual-shape-core structure or depressed cladding/dual-shape-core structure, whose zero-dispersion wavelength is shifted to the shorter wavelength side or longer wavelength side than the center wavelength of signal light (Japanese Patent Application Laid-Open No. 7-168046 and U.S. Pat. No. 5,483,612). Here, the nonlinear optical effects refer to phenomena in which signal light pulses are distorted in proportion to density of light intensity or the like due to nonlinear phenomena such as four-wavemixing (FWM), self-phase modulation (SPM), cross-phase modulation (XPM), or the like. Transmission speed and relaying intervals in repeating transmission systems are restricted by the nonlinear optical effects.

Japanese Patent Application Laid-Open No. 8-248251 proposes an optical fiber having a configuration which suppresses the occurrence of the above-mentioned nonlinear optical phenomena, which may be generated when light having a high power is incident on the optical fiber, thereby reducing the distortion in optical signals caused by these nonlinear optical phenomena. Such an optical fiber has a refractive index profile whose effective core cross-sectional area $A_{\mathit{eff}}$ is designed to be greater than about 70 $\mu$m$^2$.

Here, as disclosed in Japanese Patent Application Laid-Open No. 8-248251, the effective core cross-sectional area $A_{\mathit{eff}}$ is given by the following expression (1):

$$A_{\mathit{eff}} = 2\pi \left( \int_0^\infty E^2 r\, dr \right)^2 / \left( \int_0^\infty E^4 r\, dr \right) \quad (1)$$

wherein E is an electric field accompanying propagated light, and r is a radial distance from the core center.

On the other hand, dispersion slope is defined by the gradient of a graph indicating a dispersion characteristic in a predetermined wavelength band.

SUMMARY OF THE INVENTION

Having studied the foregoing prior art, the inventors have found the following problems.

In general, while the dispersion slope increases as the effective core cross-sectional area $A_{\mathit{eff}}$ is greater, no consideration has been made in the conventionally proposed dispersion-shifted fibers so as to optimize their dispersion slope value, which relates to the occurrences of distortion in signal light waveform due to dispersion and nonlinear optical effects, from the viewpoint of reducing distortion in the whole waveform.

Accordingly, in view of future advances in wavelength division multiplexing accompanying more sophisticated communications, expected is a situation where it is difficult to keep a transmission quality by simply employing a conventional dispersion-shifted fiber.

In order to overcome the problems such as those mentioned above, it is an object of the present invention to provide a dispersion-shifted fiber for WDM transmission, suitable for long-haul submarine cables or the like, which has a structure for effectively restraining the nonlinear optical phenomena from occurring.

The dispersion-shifted fiber according to the present invention is a single-mode optical fiber for propagating signal light in a 1.55 $\mu$m wavelength band (namely, a wavelength in the range of 1,500 nm to 1,600 nm) comprising a core region extending along a predetermined reference axis and a cladding region disposed around the outer periphery of the core region. This dispersion-shifted fiber has a zero-dispersion wavelength shifted to a shorter wavelength side or longer wavelength side from the center wavelength (1,550 nm) of the 1.55-$\mu$m wavelength band.

In particular, as characteristics at the center wavelength (1,550 nm) of the 1.55-$\mu$m wavelength band, the dispersion-shifted fiber according to the present invention has, at least, a dispersion whose absolute value is 1.0 to 4.5 ps/nm/km, a dispersion slope of 0.05 to 0.09 ps/nm$^2$/km, an effective core cross-sectional area of at least 70 $\mu$m$^2$, and a cutoff wavelength of at least 1,300 nm at a fiber length of 2 m.

In general, at a time of wavelength division multiplexing transmission, if the dispersion slope is small, a four-wave mixing which greatly distorts the waveform of a signal light is apt to occur. When the dispersion slope is large, on the other hand, the waveform of signal light is greatly distorted due to the synergistic effect of accumulated dispersion and self-phase modulation.

As a result of studies, the inventors have found that, in the case where, at a wavelength of 1,550 nm, the absolute value of dispersion is1.0 to4.5 ps/nm/km and the effective core cross-sectional area is 70 $\mu m^2$ or greater, the total amount of distortion in signal light wave form can be reduced in a long-haul transmission if the dispersion slope is 0.05 to 0.09 ps/nm²/km. Here, the total amount of distortion refers to the sum of the distortion in signal light waveform caused by the four-wave mixings and the distortions in signal light waveform caused by the synergistic effect of accumulated dispersion and self-phase modulation. Thus, the dispersion-shifted fiber according to the present invention can restrain the distortion from occurring due to the nonlinear optical effects, thereby allowing high-quality signal transmission to be realized.

Further, in the dispersion-shifted fiber according to the present invention, the core region is constituted by an inner core having a first refractive index, and an outer core disposed around the outer periphery of the inner core and having a second refractive index higher than the first refractive index; whereas a cladding region having a refractive index lower than the second refractive index is disposed around the outer periphery of the outer core. It means that this dispersion-shifted fiber can be suitably realized by a single-mode optical fiber having a refractive index profile of a ring-shaped core structure.

In a dispersion-shifted fiber having a refractive index profile of a dual-shape-core structure or depressed cladding/dual-shape-core structure, while its effective core cross-sectional area $A_{\it eff}$ is known to become large, its mode field diameter (MFD) also increases. This can also be seen from the fact that, as disclosed in Japanese Patent Application Laid-Open No. 8-220362, effective core cross-sectional area $A_{\it eff}$ and MFD satisfy the following expression:

$$A_{\it eff}=k\cdot\pi\cdot(MFD/2)^2 \quad (2)$$

wherein k is a correction coefficient. Here, the effective core cross-sectional area $A_{\it eff}$ is given by the above-mentioned expression (1).

In a dispersion-shifted fiber having a refractive index profile of a ring-shaped core structure, by changing its core diameter (outside diameter of the outer core) while keeping the ratio between the outside diameter of the inner core and the outside diameter of the outer core constant, the inventors have found the following facts. Namely, within a range where the core diameter is small, the greater is the core diameter, the smaller becomes the effective core cross-sectional area $A_{\it eff}$. Within a range where the core diameter is considerably large, by contrast, the effective core cross-sectional area $A_{\it eff}$ increases together with the core diameter. It means that there are two core diameter values yielding the same effective core cross-sectional area $A_{\it eff}$ in a dispersion-shifted fiber having a refractive index profile of a ring-shaped core structure.

Similarly, in the dispersion-shifted fiber having a refractive index profile of a ring-shaped core structure, when the core diameter (outside diameter of the outer core) is changed while the ratio between the outside diameter of the inner core and the outside diameter of the outer core is kept constant, the dispersion slope changes as well. Namely, within a range where the core diameter is small, in response to increase in core diameter, the dispersion slope as well as the effective core cross-sectional area $A_{\it eff}$ decreases. Within a range where the core diameter is considerably large, by contrast, while the effective core cross-sectional area $A_{\it eff}$ increases in response to increase in the core diameter, the dispersion slope decreases. It means that, in the dispersion-shifted fiber having a refractive index profile of a ring-shaped core structure, there is a region of core diameter where the dispersion slope decreases in response to increase in the effective core cross-sectional area $A_{\it eff}$.

In view of the foregoing, it is possible to obtain a dispersion-shifted fiber having both of an effective core cross-sectional area $A_{\it eff}$ which is controlled so as to become greater and a dispersion slope which is controlled so as to become smaller.

Consequently, when setting the effective core cross-sectional area $A_{\it eff}$ to a predetermined level, a desired dispersion slope value can be appropriately selected from two different dispersion slope values, thus making it easy to realize the dispersion-shifted fiber according to the present invention.

Further, in the dispersion-shifted fiber having a refractive index profile of a ring-shaped core structure, within a range where the core diameter is small, both effective core cross-sectional area $A_{\it eff}$ and MFD decrease as the core diameter increases. Within a range where the core diameter is considerably large, as the core diameter increases, the MFD decreases, whereas the effective core cross-sectional area $A_{\it eff}$ increases. Here, when changing the core diameter (outside diameter of the outer core), the ratio between the outside diameter of the inner core and the outside diameter of the outer core is kept constant. In general, bending loss becomes smaller as the MFD is smaller and the cutoff wavelength is longer. From this viewpoint, the larger the diameter of the core is, the more advantageous it becomes.

Specifically, according to the findings of the inventors, in order to realize a dispersion-shifted fiber having the above-mentioned characteristics, it is necessary to satisfy the following relationships:

$$0.4 \leq Ra \ (=2a/2b) \leq 0.8$$

$$5 \ \mu m \leq 2b \leq 14 \ \mu m$$

wherein 2a is an outside diameter of the inner core, and 2b is an outside diameter of the outer core.

Also, this dispersion-shifted fiber satisfies the following relationship:

$$\Delta n_1 - \Delta n_2 \geq 1\%$$

wherein $\Delta n_1$ is a relative refractive index difference of the outer core with respect to the cladding region, and $\Delta n_2$ is a relative refractive index difference of the inner core with respect to the cladding region. Namely, since the dispersion value of the dispersion-shifted fiber depends on an amount of depression ($\Delta n_1 - \Delta n_2$) of a depressed area corresponding to the core center region in its refractive index profile in the diameter direction within the core region, it is necessary for this amount of depression to be at least 1.0% in order to obtain a sufficient dispersion value. The above-mentioned relationship between the outside diameter 2a of the inner core and the outside diameter 2b of the outer core is independent of the values of relative refractive index differences $\Delta n_1$ and $\Delta n_2$.

Further, reducing the relative refractive index difference $\Delta n_2$ of the inner core with respect to the cladding region (enhancing its absolute value when it is negative) is effective in shortening cutoff wavelength. Accordingly, taking account of short-haul light transmission, in order to yield a cutoff wavelength of 1,550 nm or less at a fiber length of 2 m, it is necessary for $\Delta n_2$ to be not greater than −0.4%.

Though the cladding region can have a unitary structure (hereinafter referred to as matched cladding structure), it can also be constituted by an inner cladding disposed around the outer periphery of the outer core and having a third refractive index lower than the second refractive index (refractive index of the outer core), and an outer cladding disposed around the outer periphery of the inner cladding and having a fourth refractive index higher than the third refractive index. Namely, the dispersion-shifted fiber can have a refractive index profile of a depressed cladding/ring-shaped core structure (double structure).

Since the dispersion-shifted fiber having a depressed cladding structure has an effect to decrease undesired 2-mode light, as compared with the dispersion-shifted fiber having a matched cladding structure without a depression, the depressed cladding structure is effective to make a cutoff wavelength of 2-mode light become short. However, in the refractive index profile of the depressed cladding structure, when a width, which corresponds to a thickness (c–b) of the inner cladding, of a depression to be provided therein becomes too narrow (namely, the value 2c/2b approaches 1) or when a width of a depression provided therein becomes too wide (namely, the value 2c/2b becomes too large), an effect of the depressed cladding structure with respect to the matched cladding structure can not be obtained. Therefore, it is necessary that the inner cladding has an appropriate outer diameter to the outer core, and it is preferable that the dispersion-shifted fiber having a refractive index profile of a depressed cladding/ring-shaped core structure satisfies the following relationship:

$$1.2 \leq 2c/2b \leq 2.2.$$

In the dispersion-shifted fiber having a refractive index profile of a depressed cladding/ring-shaped core structure, $\Delta n_1$ is a relative refractive index difference of the outer core with respect to the outer cladding, whereas $\Delta n_2$ is a relative refractive index difference of the inner core with respect to the outer cladding. In this case, its cutoff wavelength becomes shorter than that of a dispersion-shifted fiber having a refractive index profile of a simple ring-shaped core structure with no depressed cladding structure, even when the values of relative refractive index differences $\Delta n_1$ and $\Delta n_2$ in the former are the same as those in the latter.

On the other hand, in the conventional optical fiber disclosed in the above-mentioned Japanese Patent Application Laid-Open No. 8-248251, the optical power distribution (or electromagnetic field distribution) is maximized at the core center of the optical fiber. In order to increase the effective core cross-sectional area $A_{eff}$ while maintaining the form of optical power distribution having such a characteristic, it is necessary to broaden a skirt portion in the optical power distribution. Thus, in order to broaden the skirt portion in the optical power distribution, the conventional optical fiber is provided with another segment (outer core) disposed outside the center segment (inner core).

As can also be seen from the above-mentioned expression (2), however, in the above-mentioned dispersion-shifted fiber having a refractive index profile of a dual-shape-core structure or depressed cladding/dual-shape-core structure, when the effective core cross-sectional area $A_{eff}$ is increased, mode field diameter (MFD) increases together therewith.

Due to the foregoing reasons, the optical fiber of the above-mentioned Japanese Patent Application Laid-Open No. 8-248251, which is designed so as to enlarge the effective core cross-sectional area $A_{eff}$, may be problematic in that bending loss increases as the effective core cross-sectional area $A_{eff}$ becomes larger.

Therefore, in order to effectively restrain the nonlinear optical phenomena from occurring while keeping the value of MFD small, the dispersion-shifted fiber according to the present invention has, at least, a refractive index profile of a ring-shaped core structure, thereby, in a cross section perpendicular to a wave-guiding direction of signal light, the part where the optical power distribution in the fundamental mode of signal light or its accompanying electromagnetic field distribution is maximized is radially separated from the center of the core region by a predetermined distance.

Even in an optical fiber having a refractive index profile of a ring-shaped core structure, when the outside diameter of its inner core is small, it does not yield a large difference in terms of the optical power distribution of propagated light or its accompanying electromagnetic field distribution as compared with an optical fiber having a refractive index profile other than that of the ring-shaped core structure. Namely, even in the optical fiber having a refractive index profile of a ring-shaped core structure, when the outside diameter of the inner core is small, the part where the optical power distribution of signal light in the fundamental mode or electromagnetic field distribution is maximized becomes to substantially overlap with the center of the core region. In such a state, the characteristic of the refractive index profile with a ring-shaped core structure can not fully be exhibited.

Specifically, in the dispersion-shifted fiber according to the present invention, in a cross section perpendicular to a wave-guiding direction of signal light, the part where the optical power distribution of signal light in a fundamental mode or its accompanying electromagnetic field distribution is maximized is radially separated from the center of the core region by about 0.5 $\mu$m to about 5 $\mu$m.

In this case, satisfying the condition of expression (3) mentioned in the following is particularly preferable in order to fully exhibit the effects of the refractive index profile with a ring-shaped core structure. Namely, the dispersion-shifted fiber according to the present invention satisfies a relationship of:

$$P_1 \geq 1.2 \times P_0 \tag{3}$$

wherein $P_0$ is an optical power of signal light in the fundamental mode at the center of the core region or an intensity of its accompanying electromagnetic field, and $P_1$ is a maximum value, in a radial direction from the center of the core region, of optical power distribution of signal light in the fundamental mode or its accompanying electromagnetic field distribution.

As a result, while keeping the MFD of the dispersion-shifted fiber at a small value, the effective core cross-sectional area $A_{eff}$ can be made greater, thereby the nonlinear optical phenomena can be reduced without increasing bending loss.

The dispersion-shifted fiber according to the present invention is a dispersion-shifted fiber whose zero-dispersion wavelength is shifted from the center wavelength (1,550 nm) of the above-mentioned 1.55-$\mu$m wavelength band by a predetermined amount. Thus, as the effective core cross-sectional area $A_{eff}$ is enlarged while the zero-dispersion wavelength is shifted, signals can be more effectively restrained from deteriorating due to four-wave mixing.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 4 to 7 are graphs for explaining changes in bit error rate (BER) caused by changes in dispersion slope, respectively showing those at dispersion slopes of 0.03 ps/nm$^2$/km, 0.05 ps/nm$^2$/km, 0.09 ps/nm$^2$/km, and 0.12 ps/nm$^2$/km;

DETAILED DESCRIPTION OF THE PREFERRED EMBODIMENTS

In the following, embodiments of the dispersion-shifted fiber according to the present invention will be explained with reference to FIGS. 1 to 27. In the explanation of the drawings, constituents identical to each other will be referred to with numerals identical to each other without their overlapping descriptions being repeated.

Embodiment 1

Figure 1:
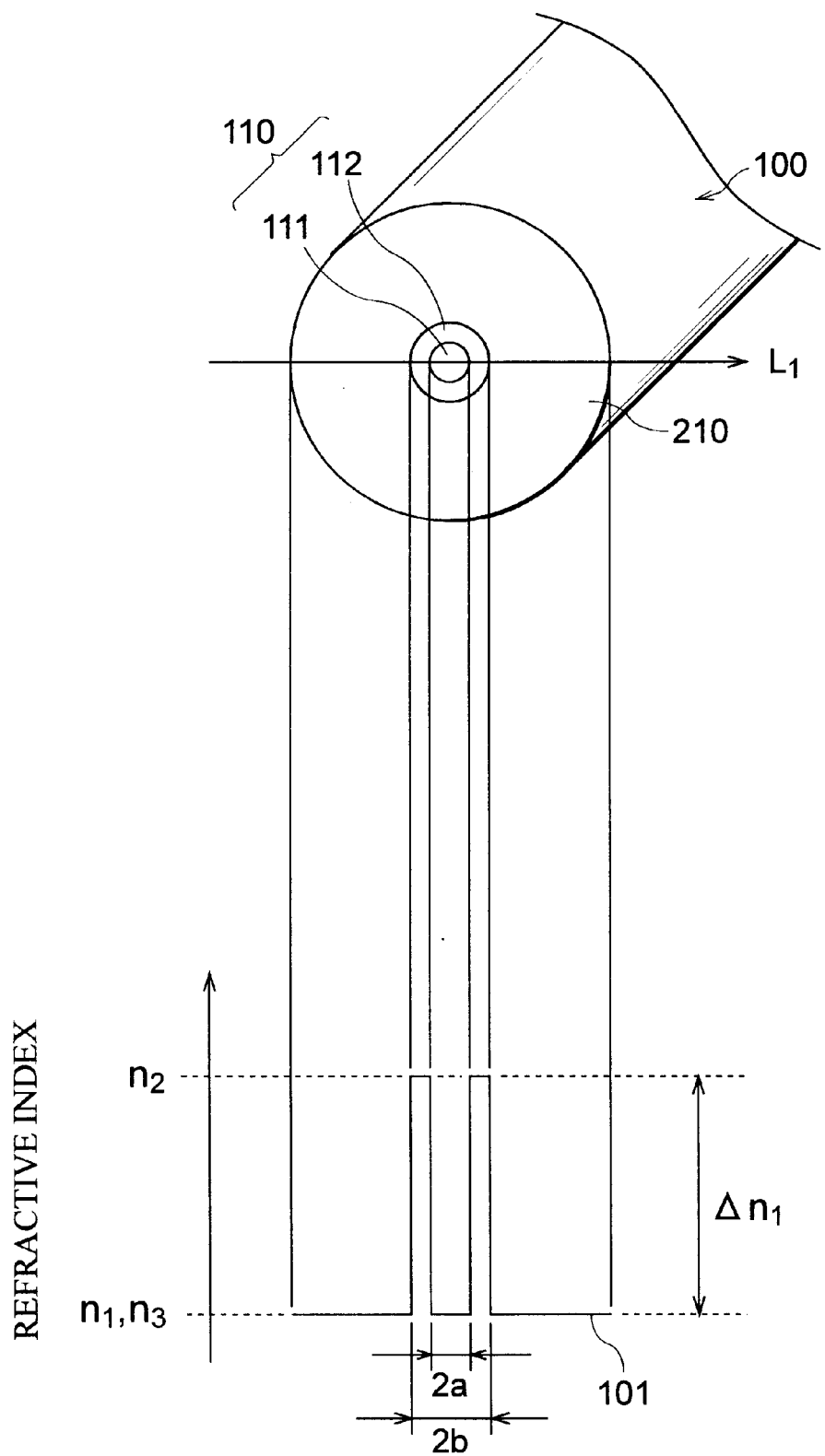
FIG. 1 is a view showing a cross-sectional structure of a dispersion-shifted fiber according to a first embodiment of the present invention and its refractive index profile in a diameter direction.

FIG. 1 is a view showing a cross-sectional structure of a dispersion-shifted fiber according to a first embodiment of the present invention and its refractive index profile in a diameter direction. As shown in FIG. 1, this dispersion-shifted fiber 100 is a single-mode optical fiber mainly composed of silica glass for propagating signal light in a wavelength band of 1.55 $\mu$m (1,500 to 1,600 nm), comprising an inner core 111 having an outside diameter of 2a and a refractive index of $n_1$; an outer core 112 disposed around the outer periphery of the inner core 111 and having an outside diameter of 2b (i.e., diameter of a core region 110 is 2b) and a refractive index of $n_2$ ($\geq n_1$); and a cladding region 210 disposed around the outer periphery of the outer core 112, having a refractive index of $n_3$ ($\leq n_2$). Here, the core region 110 is constituted by the inner core 111 and the outer core 112. Also, a refractive index profile 101 indicates refractive index at each part on line L1 in the drawing.

The dispersion-shifted fiber 100 is set such that, as characteristics at a wavelength of 1,550 nm, its absolute value of dispersion is within the range of 1.0 to 4.5 ps/nm/km, dispersion slope is within the range of 0.05 to 0.09 ps/nm$^2$/km, effective core cross-sectional area is at least 70 $\mu$m$^2$, and cutoff wavelength at 2 m length is at least 1,300 nm.

In a preferred example thereof, when the refractive index $n_1$ equals to the refractive index $n_3$ (i.e., relative refractive index difference $\Delta n_2$ of the inner core 111 with respect to the cladding region 210 is zero), the relative refractive index difference $\Delta n_1$ of the outer core 112 with respect to the cladding region 210 which is defined by:

$$\Delta n_1 = (n_2^2 - n_3^2)/(2n_3^2) \quad (4)$$

is 1.5%, the core diameter (outside diameter 2b of the outer core 112) is 9 $\mu$m, and ratio Ra (=a/b) of the outside diameter 2a of the inner core 111 to the diameter 2b of the core region 110 is 0.6; obtained at a wavelength of 1,550 nm are:

| | |
|---|---|
| dispersion (ps/nm/km): | −2.28 |
| dispersion slope (ps/nm$^2$/km): | 0.082 |
| effective core cross-sectional area ($\mu$m$^2$): | 78.2 |

-continued

| | |
|---|---|
| MFD (μm): | 6.2 |
| cutoff wavelength (nm) at 2 m length: | 2,510. |

In this specification, each relative refractive index difference is indicated by percent.

In this preferred example, the cutoff wavelength is 2,510 nm, thus failing to guarantee single-mode propagation of signal light in the 1.55-μm band at a fiber length of 2 m. Nevertheless, since the cutoff wavelength becomes shorter as the transmission distance increases, the cutoff wavelength becomes shorter than the wavelength of signal light in the case of long-haul transmission such as that on the order of 1,000 km, thus leaving no problem in practice (allowing single-mode propagation to be guaranteed).

Figure 2:
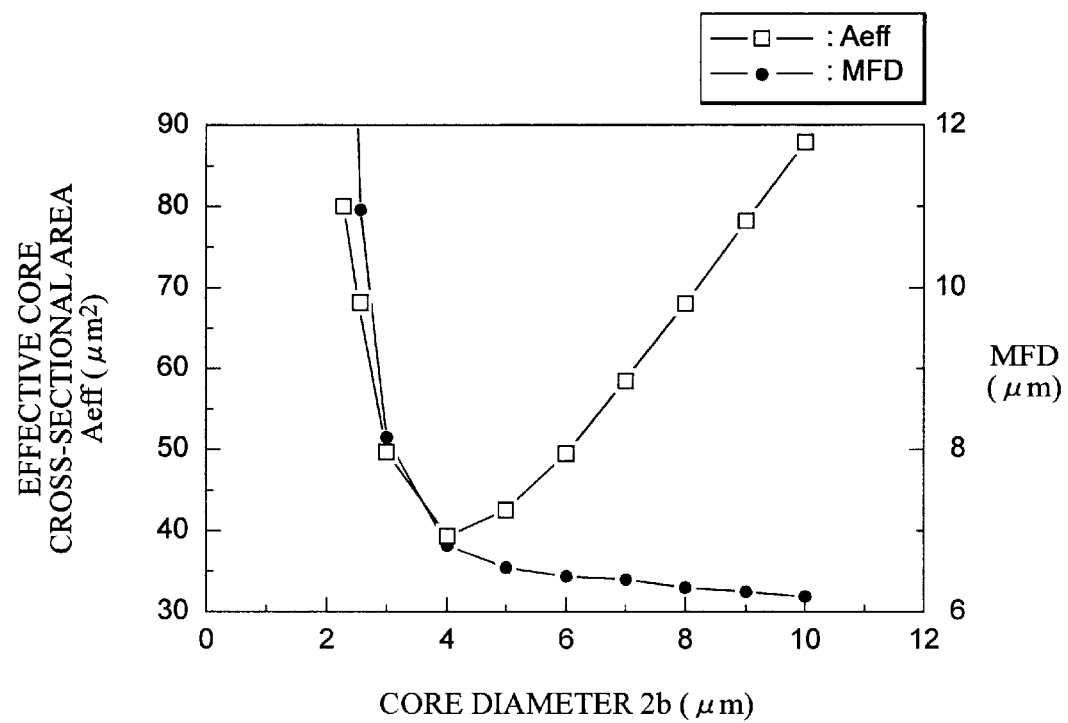
FIG. 2 is a graph showing, in a dispersion-shifted fiber having a refractive index profile of a ring-shaped core structure, changes in effective core cross-sectional area $A_{eff}$ and MFD when its core diameter 2b (outside diameter of the outer core) is changed.

FIG. 2 is a graph showing changes in effective core cross-sectional area $A_{eff}$ and MFD when the core diameter 2b (corresponding to outside diameter of the outer core 112) is changed. In FIG. 2, the relative refractive index difference $\Delta n_1$ is 1.5%, and Ra (=a/b) is 0.6.

It can be seen from FIG. 2 that, within the range where the core diameter 2b is not greater than 4 μm, both effective core cross-sectional area $A_{eff}$ and MFD decrease as the core diameter 2b-increases. Within the range where the core diameter 2b is greater than 4 μm, by contrast, it can be seen that, as the core diameter 2b increases, while the MFD decreases, the effective core cross-sectional area $A_{eff}$ increases. Namely, it can be seen that there are two values of core diameter 2b yielding the same effective core cross-sectional area $A_{eff}$.

Figure 3:
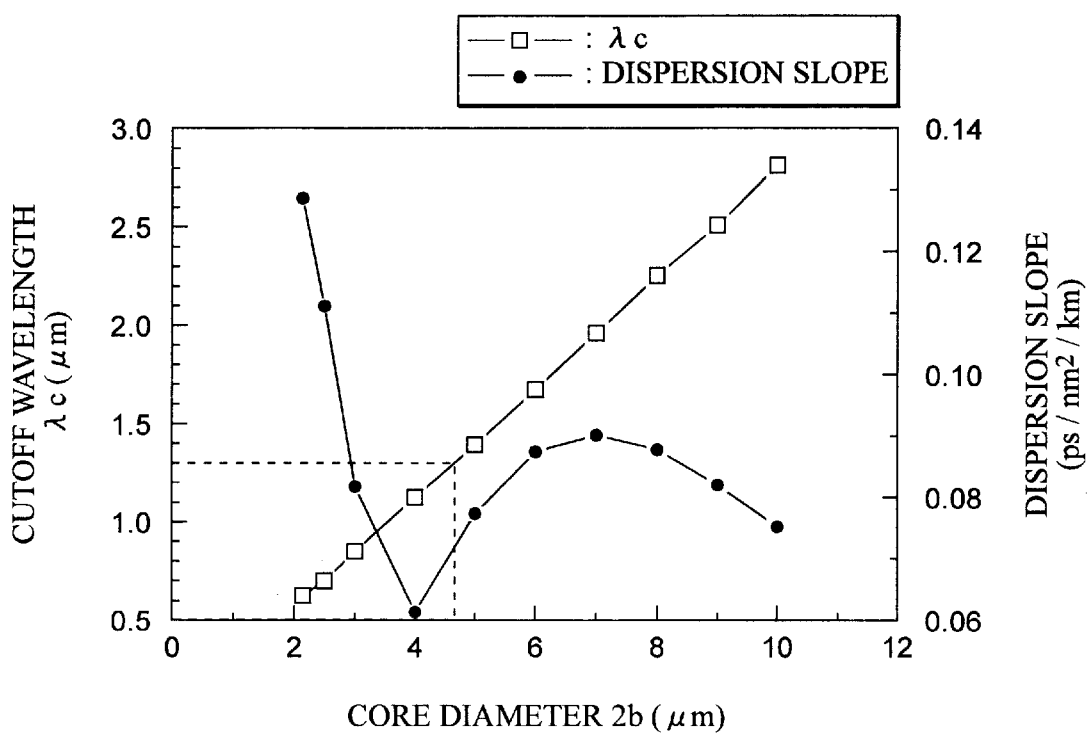
FIG. 3 is a graph showing, in a dispersion-shifted fiber having a refractive index profile of a ring-shaped core structure, changes in cutoff wavelength $\lambda_c$ and dispersion slope at a fiber length of 2 m when its core diameter 2b (outside diameter of the outer core) is changed.

FIG. 3 is a graph showing changes in cutoff wavelength $\lambda_c$ and dispersion slope at a fiber length of 2 m when the core diameter 2b (corresponding to outside diameter of the outer core 2b) is changed. In FIG. 3, the relative refractive index difference $\Delta n_1$ is 1.5%, and Ra (=a/b) is 0.6.

It can be seen from FIG. 3 that the cutoff wavelength $\lambda_c$ becomes longer as the core diameter 2b increases. On the other hand, it can be seen that, as the core diameter 2b increases, the dispersion slope decreases within the range where the core diameter 2b is not greater than 4 μm, increases within the range where the core diameter 2b is greater than 4 μm and not greater than 7 μm, and decreases again within the range where the core diameter 2b is greater than 7 μm.

Accordingly, it can be seen from FIGS. 2 and 3 that, in general, when setting the effective core cross-sectional area $A_{eff}$ to a predetermined value, a desired value of dispersion slope can be selected from two different dispersion slope values.

FIGS. 4 to 7 are views for explaining changes in bit error rate (BER) at 5 Gbps accompanying changes in dispersion slope. Upon measurement, for transmitting 16 waves of signal light (center wavelength is 1,557.2 nm, wavelength interval is 0.55 nm), while the dispersion value at the center wavelength is −2 ps/nm/km and the effective core cross-sectional area is 70 μm$^2$, the dispersion slope (ps/nm$^2$/km) is changed among 0.03 (see FIG. 4), 0.05 (see FIG. 5), 0.09 (see FIG. 6), and 0.12 (see FIG. 7). Also, the transmission distance of the dispersion-shifted fiber to be measured is set to 9,000 km, while optical fibers for dispersion compensation (in practice, single-mode optical fibers for the band of the 1.3-μm band, whose dispersion value at the center wavelength is 18 ps/nm/km) are inserted therein at intervals of 400 km in order to nullify accumulated dispersion at the center wavelength. In each of FIGS. 4 to 7, the ordinate indicates Q value which is a value equivalent to bit error rate.

Figure 8:
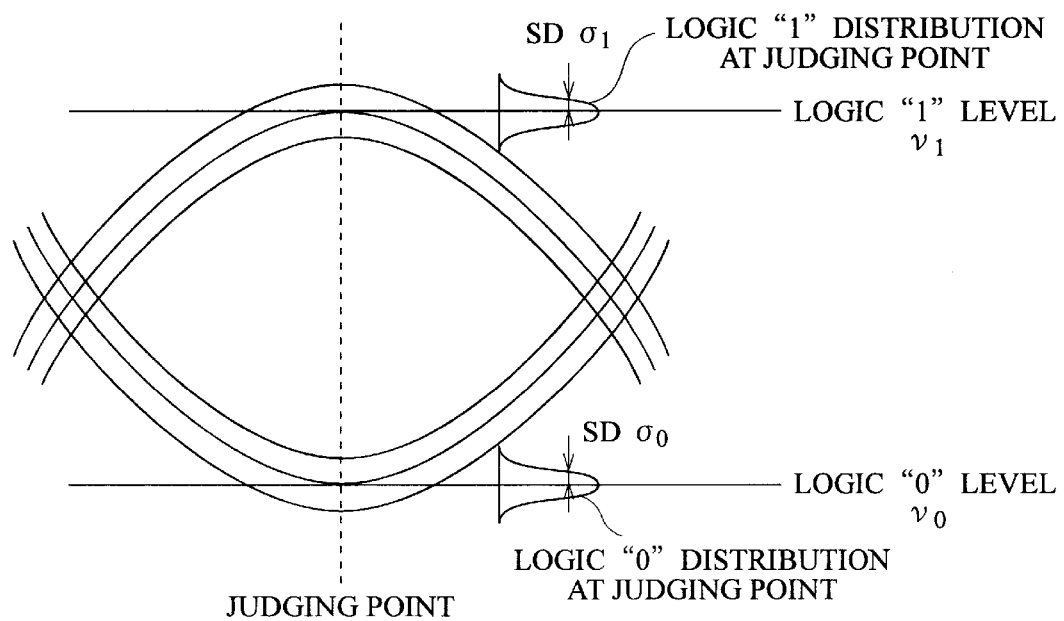
FIG. 8 is a view for explaining Q value.

FIG. 8 is a view for explaining the above-mentioned Q value. As shown in FIG. 8, in an eye pattern of a waveform of signal light at a receiving end, the Q value is defined by:

$$Q \text{ (dB)} = 10 \times \log[(v_1 - v_0)/(\sigma_1 + \sigma_0)] \quad (5)$$

wherein $v_0$ is a mean value of light intensity at logic "0" level, $\sigma_0$ is a standard deviation of light intensity at logic "0" level, $v_1$ is a mean value of light intensity at logic "1" level, and $\sigma_1$ is a standard deviation of light intensity at logic "1" level.

Here, when transmitting light, BER of $10^{-9}$ or less in the above-mentioned transmission distance is a sufficient performance. The BER of $10^{-9}$ or less is equivalent to a Q value of 15.7 dB or more.

As can be seen from FIGS. 4 to 7, the Q value deteriorates more at center channels when the dispersion slope value is smaller, while it deteriorates more at longer wavelength regions when the dispersion slope value is greater. It seems to be because four-wave mixing is likely to occur at wavelengths in the vicinity of the center channel when the dispersion slope value is small; and because, as the dispersion value increases in a long-wavelength region such as channel numbers of 14 to 16 when the dispersion slope value is large, a synergistic effect of greatly accumulated dispersion and self-phase modulation is generated.

Accordingly, it can be seen that there is an appropriate dispersion slope value for reducing BER in a wavelength band of signal light, i.e., for improving the Q value in this wavelength band. Specifically, it can be seen from FIGS. 4 to 7 that, the dispersion slope value where BER becomes $10^{-9}$ or less, which is considered to be a sufficient performance as mentioned above, is from 0.05 to 0.09 ps/nm$^2$/km.

Figure 9:
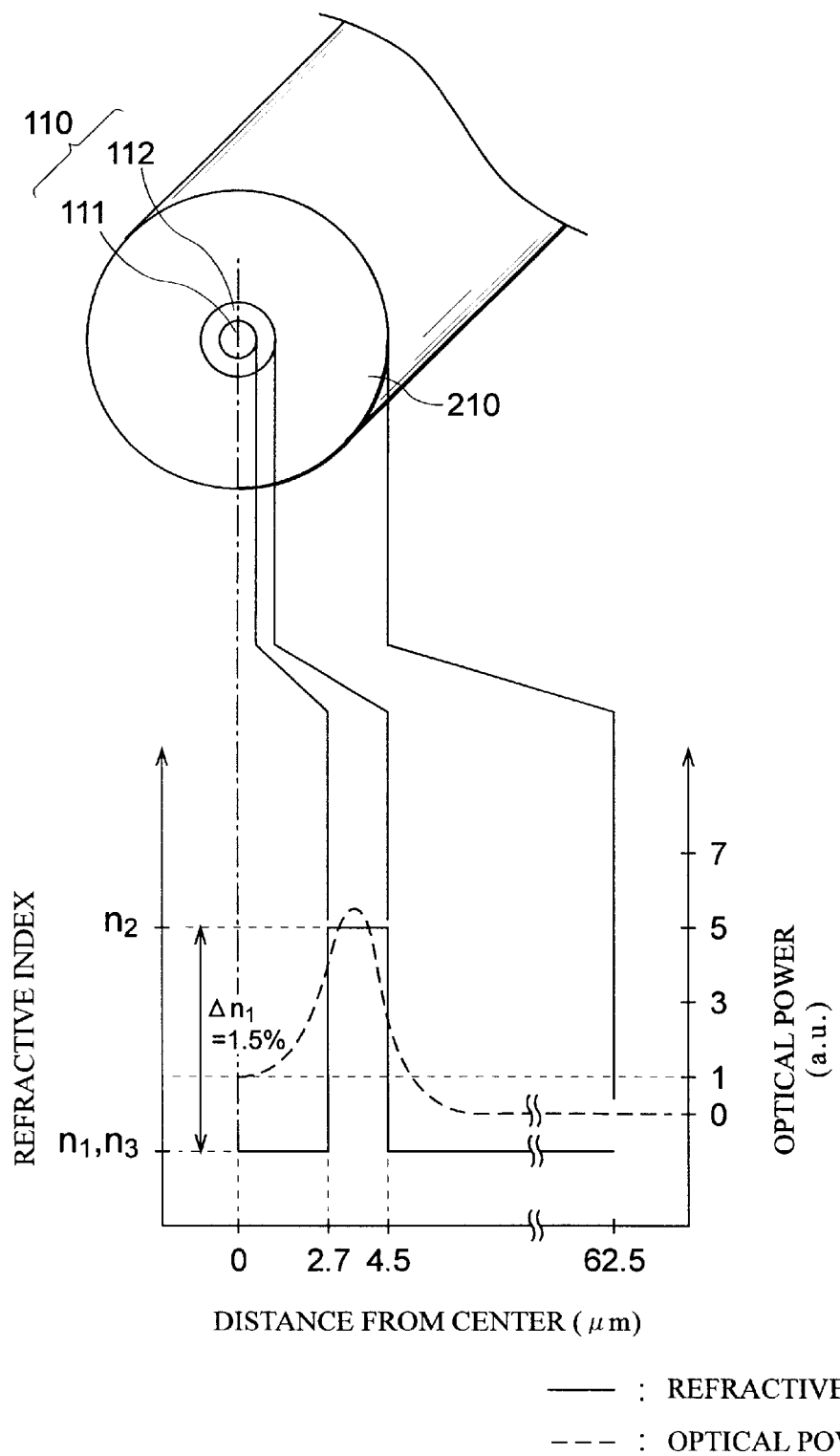
FIG. 9 is a view for explaining an optical power distribution in the fundamental mode of signal light in the dispersion-shifted fiber of FIG. 1 (including its cross-sectional structure and its refractive index profile in a diameter direction)

FIG. 9 is a view for explaining an optical power distribution in the fundamental mode of signal light in the above-mentioned preferred example. As shown in FIG. 9, in a cross section perpendicular to the wave-guiding direction of signal light, the part where the optical power distribution in the fundamental mode of signal light(equivalent to the electromagnetic field distribution accompanying the propagation of signal light) is maximized is set at a position radially separated from the center of the core region 110.

When the optical power in the fundamental mode of signal light at the center of the core region 110 is $P_0$ and that the maximum value of optical power distribution is $P_1$, the following expression stands:

$$P_1 \tilde{=} 5.5 \times P_0 > 1.2 \times P_0 \quad (6)$$

Thus, the above P$_1$satisfies the condition of the above-mentioned expression (3).

Figure 10:
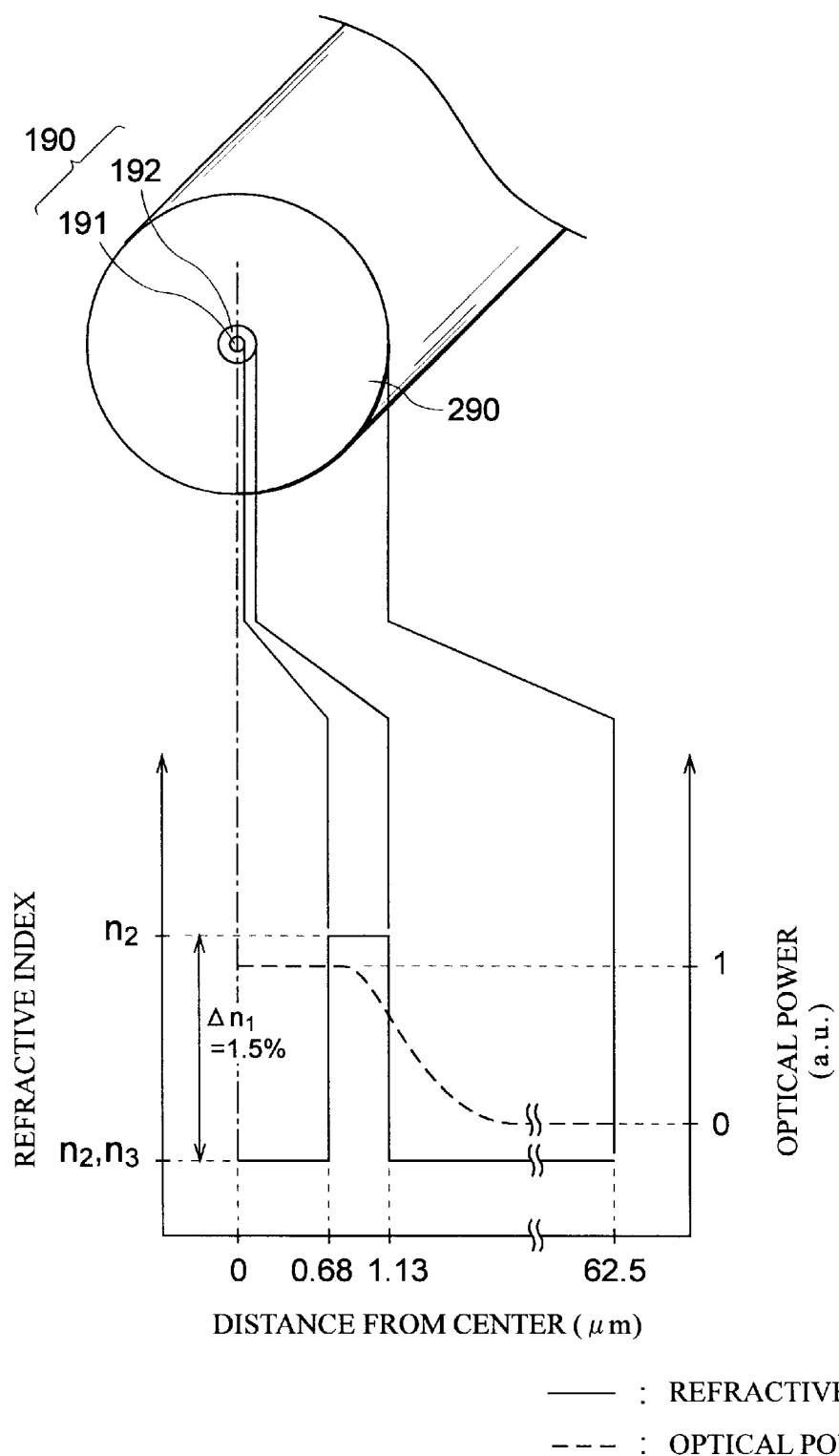
FIG. 10 is a view for explaining an optical power distribution in the fundamental mode of signal light in a dispersion-shifted fiber according to a comparative example of the first embodiment (including its cross-sectional structure and its refractive index profile in a diameter direction)

FIG. 10 is a view for explaining an optical power distribution in the fundamental mode of signal light in an optical fiber according to a comparative example in which its relative refractive index difference $\Delta n_1$ is 1.5% ($n_1 = n_3$) and Ra (=a/b) is 0.6, while it has the same effective core cross-sectional area $A_{eff}$ (=78 μm$^2$) as that of the dispersion-shifted fiber shown in FIG. 9.

As shown in FIG. 10, the optical fiber according to the comparative example comprises an inner core 191 having an outside diameter (2a) of 1.36 μm and a refractive index of $n_1$; an outer core 192 disposed around the outer periphery of the inner core 191 and having an outside diameter (2b) of 2.26 μm (i.e., diameter of a core region 190 is 2.26 μm) and a refractive index of $n_2$ (>$n_1$); and a cladding region 290 disposed around the outer periphery of the outer core 192 and having a refractive index of $n_3$ (<$n_2$). Here, the core region 190 is constituted by the inner core 191 and the outer core 192.

As can be seen from FIG. 10, in the optical fiber according to the comparative example, in a cross section perpendicular to the wave-guiding direction of signal light, the optical power distribution in the fundamental mode of signal light is maximized at the center of the core region 190.

When the optical power in the fundamental mode of signal light at the center of the core region 190 is $P_0$ and that the maximum value of optical power distribution in the fundamental mode of signal light is $P_1$, the following expression stands:

$$P_1 = P_0 \leq 1.2 \times P_0 \tag{7}$$

Thus, the above $P_1$ fails to satisfy the condition of the above-mentioned expression (3).

This optical fiber has a dispersion slope of 0.126 ps/nm$^2$/km and thus cannot attain the above-mentioned favorable BER.

By contrast, in the dispersion-shifted fiber of FIG. 9, the optical power distribution in the radial direction in the fundamental mode has a depression at the center part. Therefore, by positively adopting a refractive index profile which yields such a power distribution as shown in FIG. 6, a dispersion-shifted fiber having a large effective core cross-sectional area $A_{eff}$ and a small dispersion slope can be realized.

Figure 11:
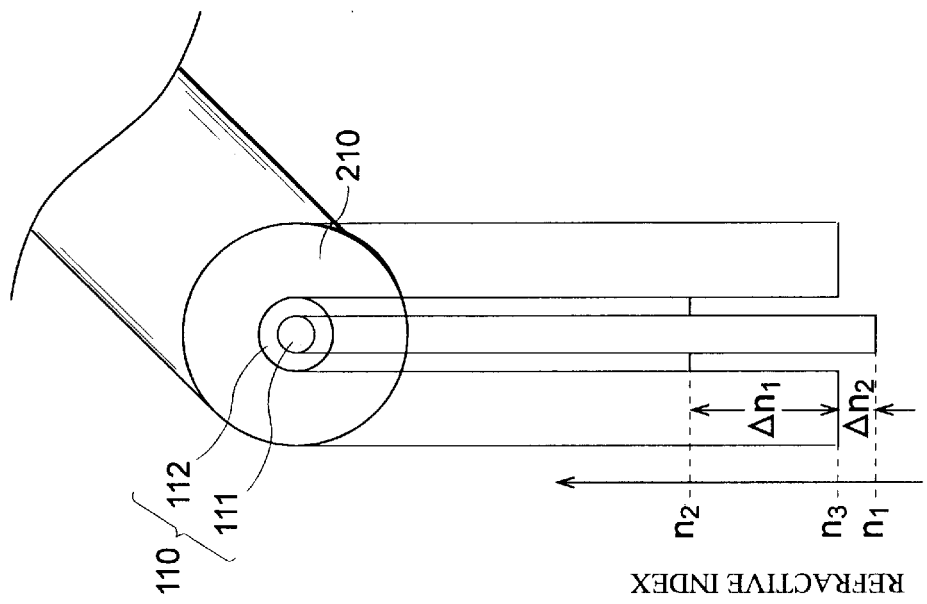
FIGS. 11 and 12 are views each showing a cross-sectional structure of a dispersion-shifted fiber according to a modified example of the first embodiment and its refractive index profile in a diameter direction.

Though the foregoing explanation of the first embodiment relates to a refractive index profile in which the refractive index $n_1$ of the inner core 111 is the same as the refractive index $n_3$ of the cladding region 210, the refractive index profile can also be such that, as shown in FIG. 11, the refractive index $n_1$ is greater than the refractive index $n_3$. Alternatively, as shown in FIG. 12, the refractive index profile can be such that refractive index $n_1$ is less than refractive index $n_3$.

Figure 12:
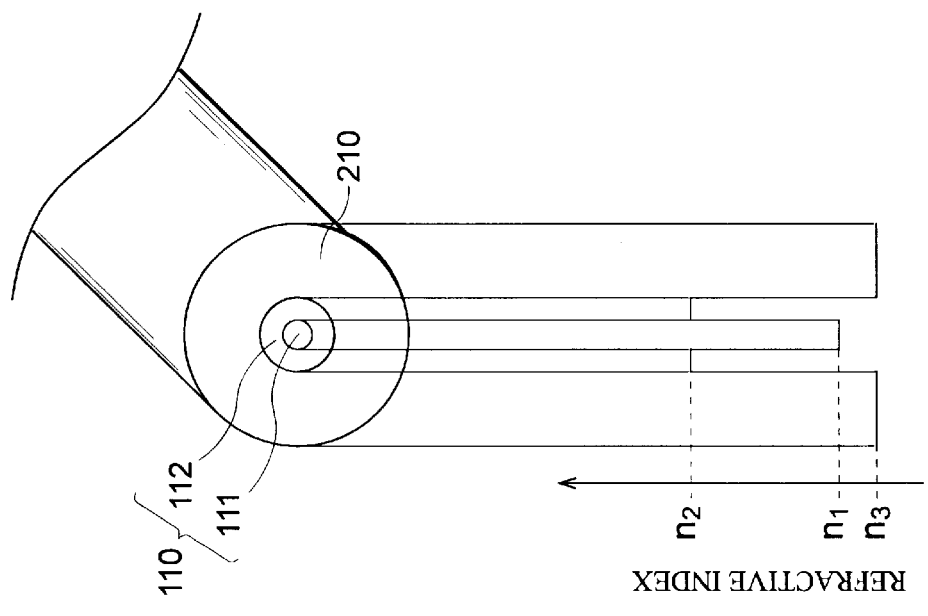

For example, in the dispersion-shifted fiber shown in FIG. 12, when the relative refractive index difference $\Delta n_1$ of the outer core 112 with respect to the cladding region 210 which is defined by:

$$\Delta n_1 = (n_2^2 - n_3^2)/(2n_3^2) \tag{8}$$

is 1.1%, relative refractive index difference $\Delta n_2$ of the inner core 111 with respect to the cladding region 210 which is defined by:

$$\Delta n_2 = (n_1^2 - n_3^2)/(2n_3^2) \tag{9}$$

is −0.6%, the core diameter 2b (outside diameter of the outer core) is 6.8 μm, and ratio Ra (=a/b) of the outside diameter 2a of the inner core 111 to the diameter 2b of the core region 110 is 0.6; obtained at a wavelength of 1,550 nm are:

| | |
|---|---|
| dispersion (ps/nm/km): | −2.18 |
| dispersion slope (ps/nm$^2$/km): | 0.086 |
| effective core cross-sectional area (μm$^2$): | 81.4 |
| MFD (μm): | 7.6 |
| cutoff wavelength (nm) at a length of 2 m: | 1,500. |

In this example, the cutoff wavelength at 2 m length is 1,500 m, which is shorter than the wavelength of signal light in the 1.55-μm band, thus making it usable for short-haul transmission as well.

Second Embodiment

Figure 13:
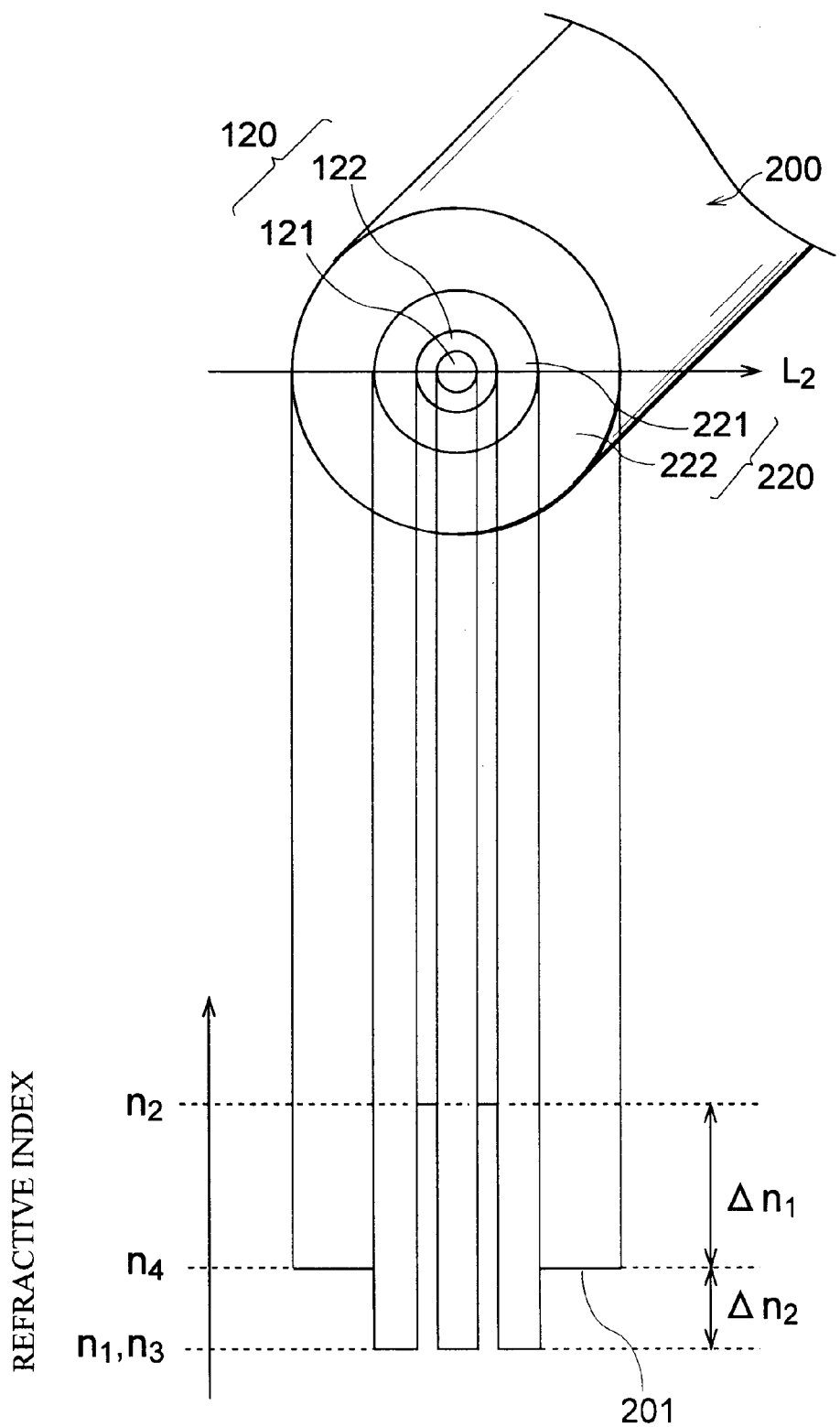
FIG. 13 is a view showing a cross-sectional structure of a dispersion-shifted fiber according to a second embodiment of the present invention and its refractive index profile in a diameter direction.

FIG. 13 is a view showing a cross-sectional structure of a dispersion-shifted fiber according to a second embodiment of the present invention and its refractive index profile in a diameter direction. As shown in FIG. 13, this dispersion-shifted fiber 200 is a single-mode optical fiber for propagating signal light in the 1.55-μm wavelength band and, in particular, has a refractive index profile 201 of a depressed cladding/ring-shaped core structure. Namely, the dispersion-shifted fiber 200 of the second embodiment comprises an inner core 121 having an outside diameter of 2a and a refractive index of $n_1$; an outer core 122 disposed around the outer periphery of the inner core 121 and having an outside diameter of 2b (i.e., diameter of a core region 120 is 2b) and a refractive index of $n_2$ (>$n_1$); an inner cladding 221 disposed around the outer periphery of the outer core 122 and having an outside diameter of 2c and a refractive index of $n_3$ (<$n_2$); and an outer cladding 222 disposed around the outer periphery of the inner cladding 221 and having a refractive index of $n_4$ (>$n_3$). Here, the core region 120 is constituted by the inner core 121 and the outer core 122, whereas a cladding region 220 is constituted by the inner cladding 221 and the outer cladding 222. Also, a refractive index profile 201 indicates refractive index at each part on line L2 in the drawing.

The dispersion-shifted fiber 200 is set such that, as characteristics at a wavelength of 1,550 nm, its absolute value of dispersion is within the range of 1.0 to 4.5 ps/nm/km, dispersion slope is within the range of 0.05 to 0.09 ps/nm$^2$/km, effective core cross-sectional area is at least 70 m$^2$, and cutoff wavelength at 2 m length is at least 1,300 nm.

In a preferred example thereof, when the refractive index $n_1$ equals to the refractive index $n_3$, the relative refractive index difference $\Delta n_1$ of the outer core 122 with respect to the outer cladding 222 which is defined by:

$$\Delta n_1 = (n_2^2 - n_4^2)/(2n_4^2) \tag{10}$$

is 1.1%, relative refractive index difference $\Delta n_2$ of the inner core 121 with respect to the outer cladding 222 which is defined by:

$$\Delta n_2 = (n_1^2 - n_4^2)/(2n_4^2) \tag{11}$$

is −0.4%, the core diameter 2b (outside diameter of the outer core 122) is 9 μm, ratio Ra (=a/b) of the outside diameter 2a of the inner core 121 to the diameter 2b of the core region 120 is 0.6, and the outside diameter 2c of the inner cladding 221 is 18 μm; obtained at a wavelength of 1,550 nm are:

| | |
|---|---|
| dispersion (ps/nm/km): | −2.62 |
| dispersion slope (ps/nm$^2$/km): | 0.076 |
| effective core cross-sectional area (μm$^2$): | 80.1 |
| MFD (μm): | 6.3 |
| cutoff wavelength (nm) at a length of 2 m: | 1,702. |

In this preferred example, the cutoff wavelength is 1,702 nm, thus failing to guarantee single-mode propagation of signal light in the 1.55-μm band at 2 m length. Nevertheless, since the cutoff wavelength becomes shorter as the transmission distance increases, the cutoff wavelength becomes shorter than the wavelength of signal light in the case of long-haul transmission such as that on the order of 1,000 km, thus leaving no problem in practice.

In a dispersion-shifted fiber having a refractive index profile of a depressed cladding/ring-shaped core structure such as that of the second embodiment, when the core diameter 2b is changed, the effective core cross-sectional area $A_{eff}$ and MFD would change similarly to those in the first embodiment, i.e., as shown in FIG. 2. Accordingly, also in the case of such a dispersion-shifted fiber, there are two values of core diameter 2b yielding the same effective core cross-sectional area $A_{eff}$.

Also, in a dispersion-shifted fiber having a refractive index profile of a depressed cladding/ring-shaped core structure such as that of the second embodiment, when the core diameter 2b is changed, the cutoff wavelength $\lambda_c$ at 2 m length and dispersion slope would change in a manner similar to those in the first embodiment, i.e., as shown in FIG. 3. Accordingly, also in the case of such a dispersion-shifted fiber, in order to attain a predetermined value of effective core cross-sectional area $A_{eff}$, in general, a desired dispersion slope value can be selected from two different dispersion slope values.

Further, in a dispersion-shifted fiber having a refractive index profile of a depressed cladding/ring-shaped core structure such as that of the second embodiment, when the dispersion slope is changed, BER at 5 Gbps would change in a manner similar to that in the first embodiment, i.e., as shown in FIGS. 4 to 7. Accordingly, also in the case of such a dispersion-shifted fiber, the dispersion slope value at which BER becomes $10^{-9}$ or less is from 0.05 to 0.09 ps/nm²/km.

Figure 14:
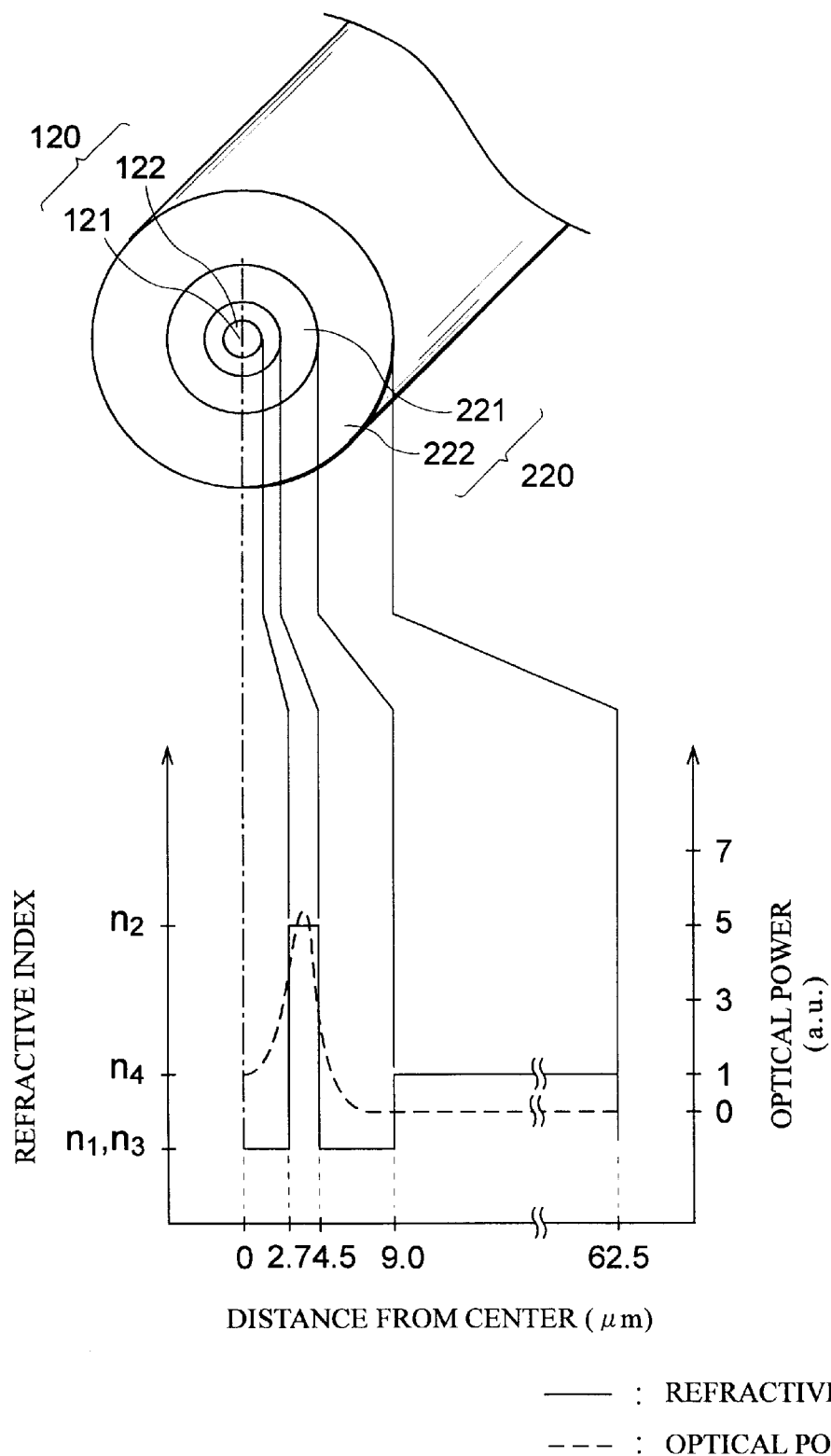
FIG. 14 is a view for explaining an optical power distribution in the fundamental mode of the signal light in the dispersion-shifted fiber of FIG. 13 (including its cross-sectional structure and its refractive index profile in a diameter direction)

FIG. 14 is a view for explaining an optical power distribution of signal light in a fundamental mode in a preferred example of the second embodiment. As shown in FIG. 14, which is similar to FIG. 9, in a cross section perpendicular to the wave-guiding direction of the signal light, the part where the optical power distribution of signal light in the fundamental mode is maximized is set at a position radially shifted from the center of the core region 120.

When the optical power in the fundamental mode of signal light at the center of the core region 120 is $P_0$ and that the maximum value of optical power distribution is $P_1$, the following expression stands:

$$P_1 = 5.3 \times P_0 > 1.2 \times P_0 \qquad (12)$$

Thus, the above $P_1$ satisfies the condition of the above-mentioned expression (3).

With respect to a dispersion-shifted fiber having a refractive index profile of a depressed cladding/ring-shaped core structure such as that of the second embodiment; in an optical fiber of a comparative example in which the relative refractive index difference $\Delta n_1$ is 1.1%, the relative refractive index difference $\Delta n_2$ is $-0.4\%$, and Ra (=a/b) is 0.6, while it has the same effective core cross-sectional area $A_{eff}$ (=80.1 $\mu m^2$) as that of the dispersion-shifted fiber shown in FIG. 14, the optical power distribution in the fundamental mode of signal light in a cross section perpendicular to the wave-guiding direction of the signal light is maximized in the vicinity of the center of the core region, thereby its dispersion slope cannot attain the above-mentioned favorable BER.

By contrast, in the dispersion-shifted fiber of FIG. 14, the optical power distribution in the radial direction in the fundamental mode has a depression at the center part. When a refractive index yielding such an optical power distribution is positively utilized, a dispersion-shifted fiber having a large effective core cross-sectional area $A_{eff}$ and a small dispersion slope can be realized.

Figure 15:
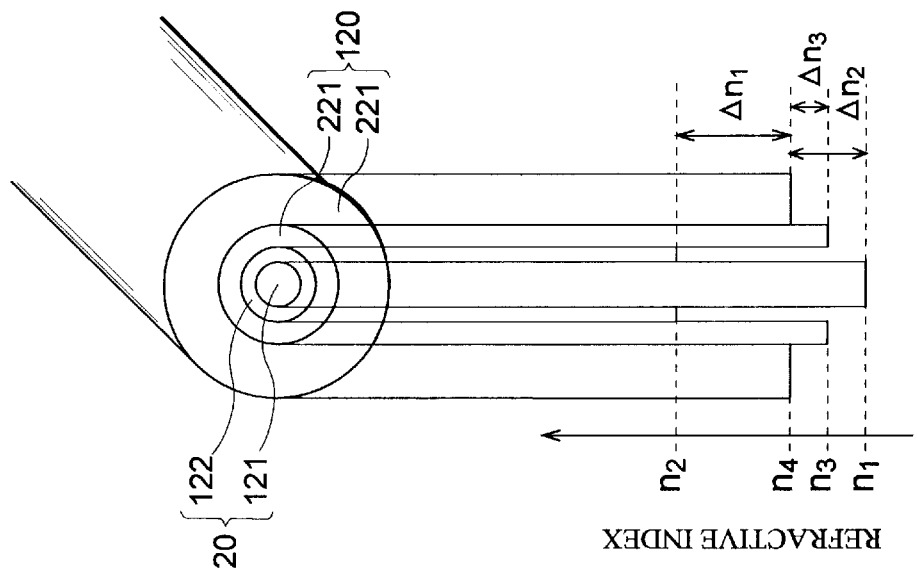
FIGS. 15 and 16 are views each showing a cross-sectional structure of a dispersion-shifted fiber according to a modified example of the second embodiment and its refractive index profile in a diameter direction.

Though the foregoing explanation of the second embodiment relates to a refractive index profile in which the refractive index $n_1$ of the inner core 121 is the same as the refractive index $n_3$ of the inner cladding 221, the refractive index profile can also be such that, as shown in FIG. 15, the refractive index $n_1$ is greater than the refractive index $n_3$. Alternatively, as shown in FIG. 16, the refractive index profile can be such that the refractive index $n_1$ is less than the refractive index $n_3$.

Figure 16:
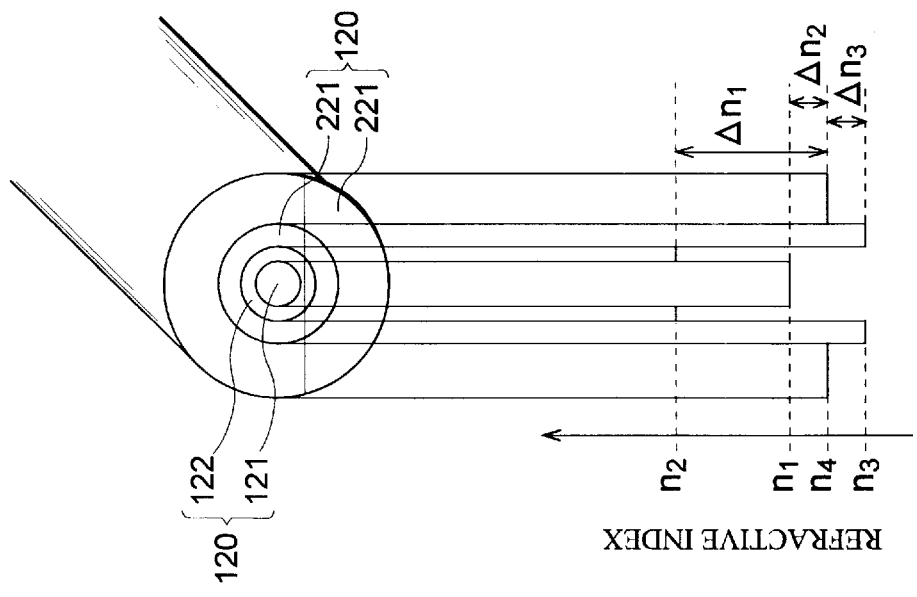

In the dispersion-shifted fiber having a depressed cladding structure as shown in FIGS. 15 and 16, each of a width and a depth of a depression to be provided in the above refractive index profile should be set within an appropriate range. The width of depression corresponds to a thickness (c–b) of the inner cladding in a diameter direction of the fiber and the depth of depression corresponds to a relative refractive index difference of the inner cladding with respect to the outer cladding.

Since the dispersion-shifted fiber having a refractive index profile of a depressed cladding structure has an effect to decrease undesired 2-mode light, as compared with the dispersion-shifted fiber having a matched cladding structure without a depression, it is effective to make a cutoff wavelength of 2-mode light become short. However, in the refractive index profile of the depressed cladding structure, when a width, which corresponds to a thickness (c–b) of the inner cladding, of a depression to be provided therein becomes too narrow (namely, the value 2c/2b approaches 1) or when a width of a depression provided therein becomes too wide (namely, the value 2c/2b becomes too large), an effect of the depressed cladding structure with respect to the matched cladding structure can not be obtained. Therefore, it is necessary that the inner cladding has an appropriate outer diameter to the outer core, and it is preferable that the dispersion-shifted fiber having a refractive index profile of a depressed cladding/ring-shaped core structure satisfies the following relationship:

$$1.2 \leq 2c/2b \leq 2.2.$$

Additionally, in the dispersion-shifted fiber according to the present invention, it is necessary for the relative refractive index difference $\Delta n_1$ of the outer core with respect to the cladding region (or outer cladding) and the relative refractive index difference $\Delta n_2$ of the inner core with respect to the cladding region (or outer cladding) to satisfy the following relationship:

$$\Delta n_1 - \Delta n_2 \geq 1\%.$$

Namely, since the dispersion value of the dispersion-shifted fiber depends, in a refractive index profile in a diameter direction within its core region, on the amount of depression $(\Delta n_1 - \Delta n_2)$ of a depressed area corresponding to the core center region; in order to obtain a sufficient dispersion value, at least the amount of depression is required to be 1.0% or more.

For example, in the dispersion-shifted fiber having a refractive index profile as shown in FIG. 16, when the relative refractive index difference $\Delta n_1$ of the outer core 122 with respect to the outer cladding 222 which is defined by:

$$\Delta n_1 = (n_2^2 - n_4^2)/(2n_4^2) \qquad (13)$$

is 0.97%, relative refractive index difference $\Delta n_2$ of the inner core 121 with respect to the outer cladding 222 which is defined by:

$$\Delta n_2 = (n_1^2 - n_4^2)/(2n_4^2) \qquad (14)$$

is $-0.45\%$, relative refractive index difference $\Delta n_3$ of the inner cladding 221 with respect to the outer cladding 222 which is defined by:

$$\Delta n_3 = (n_3^2 - n_4^2)/(2n_4^2) \qquad (15)$$

is $-0.20\%$, the core diameter 2b (outside diameter of the outer core 122) is 8 $\mu m$, ratio Ra (=a/b) of the outside diameter 2a of the inner core 121 to the diameter 2b of the core region 120 is 0.6, and ratio (2c/2b) of the outside diameter 2c of the inner cladding 221 to the outside diameter 2b of the core region 120 is 2.0; obtained at a wavelength of 1,550 nm are:

| | |
|---|---:|
| dispersion (ps/nm/km): | −1.88 |
| dispersion slope (ps/nm²/km): | 0.077 |
| effective core cross-sectional area ($\mu m^2$): | 83.0 |
| MFD ($\mu m$): | 7.2 |
| cutoff wavelength (nm) at a length of 2 m: | 1,473. |

When the optical power in the fundamental mode of signal light at the center of the core region 120 is $P_0$ and that the maximum value of optical power distribution is $P_1$, the following expression stands:

$$P_1 \simeq 3.6 \times P_0 > 1.2 \times P_0 \quad (16)$$

Thus, the above $P_1$ satisfies the condition of the above-mentioned expression (3).

Further, when the relative refractive index difference $\Delta n_1$ of the outer core 122 with respect to the outer cladding 222 which is defined by:

$$\Delta n_1 = (n_2^2 - n_4^2)/(2n_4^2) \quad (17)$$

is 0.90%, relative refractive index difference $\Delta n_2$ of the inner core 121 with respect to the outer cladding 222 which is defined by:

$$\Delta n_2 = (n_1^2 - n_4^2)/(2n_4^2) \quad (18)$$

is −0.45%, relative refractive index difference $\Delta n_3$ of the inner cladding 221 with respect to the outer cladding 222 which is defined by:

$$\Delta n_3 = (n_3^2 - n_4^2)/(2n_4^2) \quad (19)$$

is −0.45%, the core diameter 2b (outside diameter of the outer core 122) is 8.3 $\mu m$, ratio Ra (=a/b) of the outside diameter 2a of the inner core 121 to the diameter 2b of the core region 120 is 0.6, and ratio (2c/2b) of the outside diameter 2c of the inner cladding 221 to the outside diameter 2b of the core region 120 is 1.5; obtained at a wavelength of 1,550 nm are:

| | |
|---|---:|
| dispersion (ps/nm/km): | −2.19 |
| dispersion slope (ps/nm²/km): | 0.069 |
| effective core cross-sectional area ($\mu m^2$): | 77.2 |
| MFD ($\mu m$): | 7.0 |
| cutoff wavelength (nm) at a length of 2 m: | 1,476. |

When the optical power in the fundamental mode of signal light at the center of the core region 120 is $P_0$ and that the maximum value of optical power distribution is $P_1$, the following expression stands:

$$P_1 \simeq 3.2 \times P_0 > 1.2 \times P_0 \quad (20)$$

Thus, the above $P_1$ satisfies the condition of the above-mentioned expression (3).

Further, decreasing (or increasing the absolute value thereof when negative) the relative refractive index difference $\Delta n_2$ of the inner core with respect to the cladding region (or outer cladding) is effective in shortening its cutoff wavelength. Accordingly, when short-haul optical transmission is taken into consideration, it is necessary for $\Delta n_2$ to be −0.4% or smaller in order to attain a cutoff wavelength of 1,550 nm or shorter at 2 m length.

Figures 17, 18:
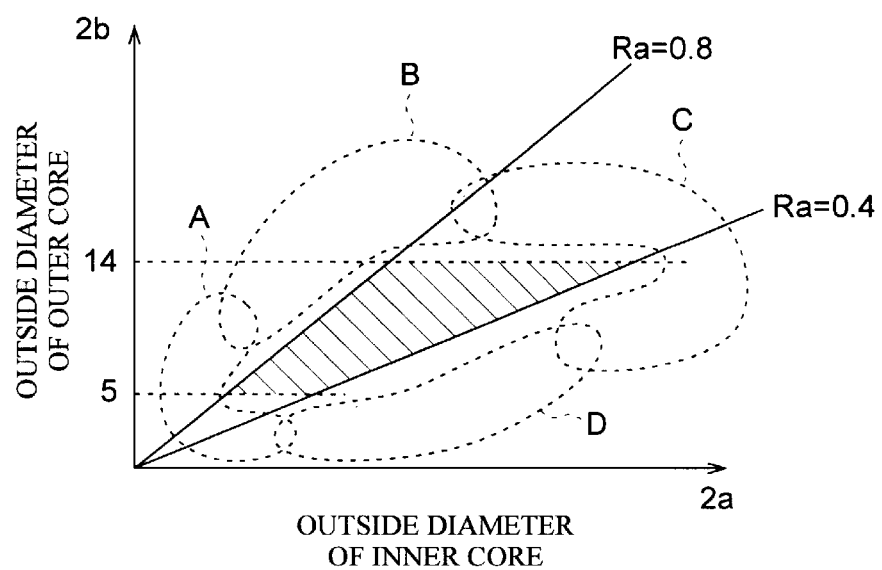
FIG. 17 is a table for explaining tolerances of structural parameters for realizing various characteristics of the dispersion-shifted fiber according to the present invention.
FIG. 18 is a graph showing a relationship between the outside diameter of the inner core and the outside diameter of the outer core for realizing various characteristics of the dispersion-shifted fiber according to the present invention.

As various characteristics yielding each dispersion-shifted fiber mentioned above, tolerances of $\Delta n_1$, $\Delta n_2$, Ra (=2a/2b), and 2b are shown in FIGS. 17 and 18. In the case of a dispersion-shifted fiber having a refractive index of a ring-shaped core structure, $\Delta n_1$ is the relative refractive index difference of the outer core with respect to the cladding region, whereas $\Delta n_2$ is the relative refractive index difference of the inner core with respect to the cladding region. In the case of a dispersion-shifted fiber having a refractive index of a depressed cladding/ring-shaped core structure, $\Delta n_1$ is the relative refractive index difference of the outer core with respect to the outer cladding, whereas $\Delta n_2$ is the relative refractive index difference of the inner core with respect to the outer cladding.

As can be seen from the table of FIG. 17, in order to obtain the above-mentioned various characteristics, it is necessary for the outside diameter 2a of the inner core and the outside diameter 2b of the outer core (meaning as core diameter) to satisfy the following relationships:

$$0.4 \leq Ra\ (=2a/2b) \leq 0.8$$

$$5\ \mu m \leq 2b \leq 14\ \mu m.$$

The above relationships do not depend on the relative refractive index differences $\Delta n_1$ and $\Delta n_2$. When these relationships are not satisfied, the above-mentioned various characteristics of the dispersion-shifted fiber cannot be obtained. In the graph of FIG. 18, the hatched area is a region where the outside diameter 2a of the inner core and the outside diameter 2b of the outer core (meaning as core diameter) satisfy the above-mentioned relationships. For example, (a) when the values of Ra (=2a/2b) and 2b are in the area indicated by A in FIG. 18, the dispersion slope value becomes too large; (b) in the area indicated by B therein, the effective core cross-sectional area $A_{\mathit{eff}}$ becomes too large, and bending loss increases; (c) in the area indicated by C therein, the dispersion value becomes too large; and (d) in the area indicated by D therein, the effective core cross-sectional area $A_{\mathit{eff}}$ becomes too small.

As explained in the foregoing, since the dispersion-shifted fiber according to the present invention is set such that, as various characteristics at a wavelength of 1,550 nm, the absolute value of dispersion is within the range of 1.0 to 4.5 ps/nm/km, the effective core cross-sectional area $A_{\mathit{eff}}$ is at least 70 $\mu m^2$, the cutoff wavelength at 2 m length is at least 1,300 nm, and the dispersion slope is within the range of 0.05 to 0.09 ps/nm²/km; it can realize high-quality long-haul optical transmission, while effectively restraining nonlinear optical effects from occurring.

Further, since the dispersion-shifted fiber according to the present invention has a refractive index profile of a ring-shaped core structure (including a refractive index profile of a depressed cladding/ring-shaped core structure), the dispersion-shifted fiber having the above characteristics at the wavelength of 1550 nm can be realized favorably.

Figure 19:
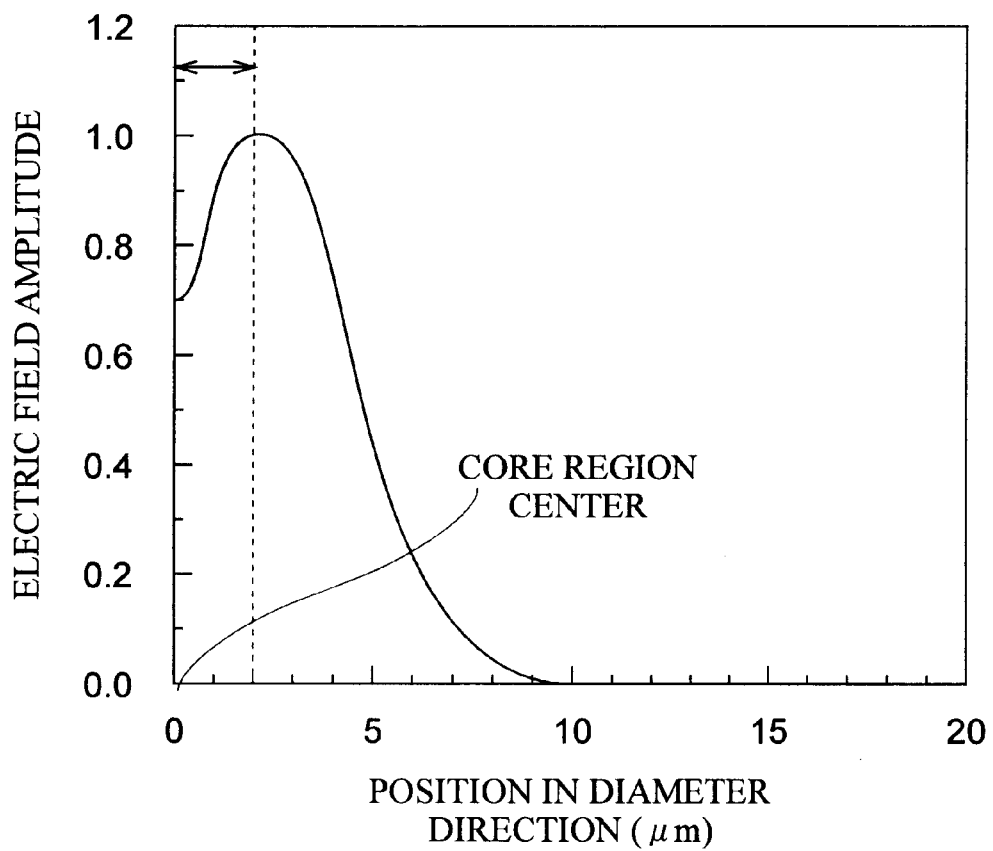
FIG. 19 is a graph showing an electromagnetic field distribution (corresponding to an optical power distribution) in a diameter direction in the dispersion-shifted fiber according to the present invention.

Moreover, the refractive index profile of the dispersion-shifted fiber according to the present invention is adjusted such that the position where the optical power distribution in the fundamental mode of signal light is maximized is radially separated from the center of the core region by a predetermined distance. Specifically, the inventors prepared a plurality of optical fiber samples each having a form of electromagnetic field distribution (equivalent to the optical power distribution) which can be approximately regarded as a Gaussian distribution, while the position where the electromagnetic field distribution is maximized is separated from the center of the core region by a predetermined distance. FIG. 19 is a graph showing a typical example of electromagnetic field distribution in thus prepared plurality of optical fiber samples. In this graph, the electric field amplitude indicated in the ordinate is standardized with its maximum value taken as 1.

Figure 20:
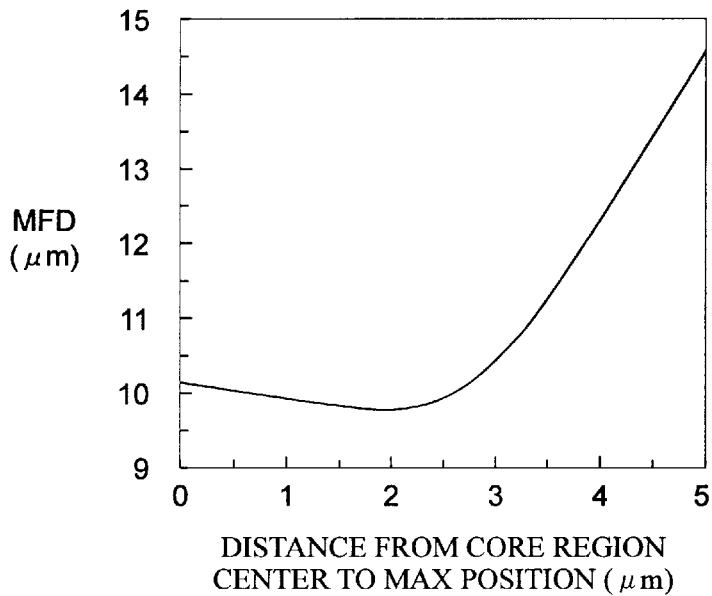
FIG. 20 is a graph showing a relationship between distance ($\mu$m) from the center of the core region to a position where the electromagnetic field value (corresponding to optical power) is maximized and MFD ($\mu$m) in the dispersion-shifted fiber according to the present invention.
Figure 21:
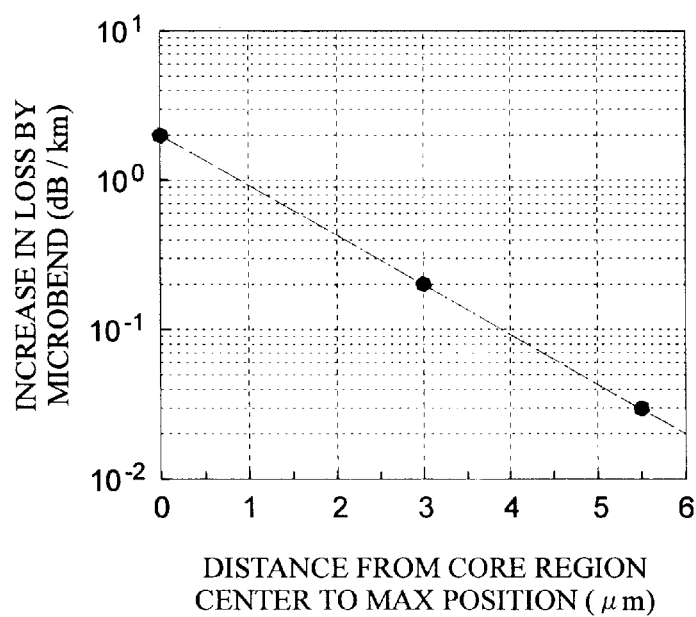
FIG. 21 is a graph showing a relationship between distance ($\mu$m) from the center of the core region to a position where the electromagnetic field value (corresponding to optical power) is maximized and increase in loss (dB/km) caused by microbend.

Of thus prepared optical fiber samples, the inventors further selected having an effective core cross-sectional area $A_{eff}$ of about 80 $\mu m^2$, and investigated the relationship between the distance from the position of the maximum electromagnetic field distribution to the center of the core region and the mode field diameter (MFD). FIG. 20 is a graph showing the dependence of MFD on distance, whereas FIG. 21 is a graph showing the dependence of loss caused by microbend on distance. As shown in FIG. 20, within the range where the distance from the center of the core region to the maximum position of electromagnetic field distribution is from about 0.5 $\mu m$ to about 2.5 $\mu m$, MFD decreases as the distance increases, from which it has been confirmed that the dispersion-shifted fiber according to the present invention can reduce MFD while keeping an effective core cross-sectional area $A_{eff}$ equivalent to that in the conventional optical fiber.

On the other hand, as shown in FIG. 21, the longer is the distance from the center of the core region to the position where the electromagnetic field distribution is maximized, the smaller becomes the loss caused by microbend. Accordingly, when the microbend loss is taken into consideration, the above-mentioned distance should preferably be made as long as possible. Nevertheless, when this distance exceeds 5 $\mu m$, the cutoff wavelength extremely shifts to the longer wavelength side than the signal light wavelength, thus failing to secure single-mode optical transmission.

In view of the foregoing, the dispersion-shifted fiber according to the present invention is designed such that the position where the optical power distribution of signal light in the fundamental mode is maximized is radially separated from the center of the core region by 0.5 $\mu m$ to 5 $\mu m$.

Figures 22, 23:
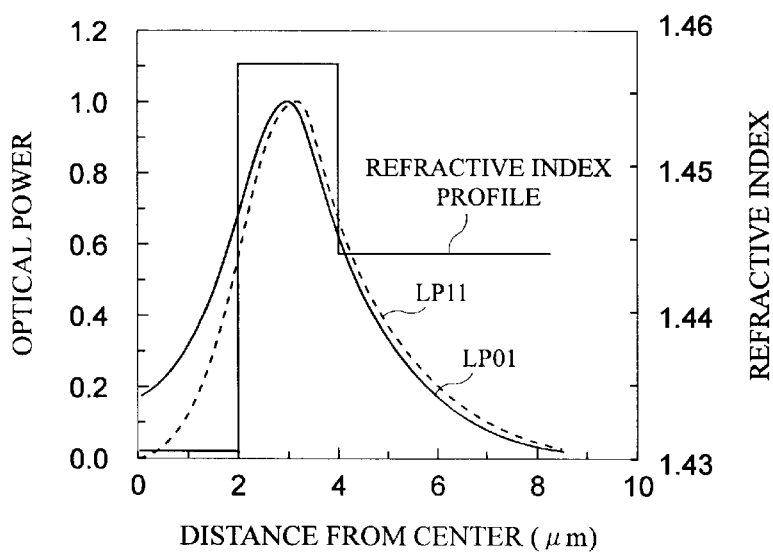
FIG. 22 is a table showing various characteristics of specific samples in the dispersion-shifted fiber according to the present invention.
FIG. 23 is a graph showing an example of refractive index profile in the dispersion-shifted fiber according to the present invention and its optical power distribution along a diameter direction thereof.

FIG. 22 shows results of measurement of various characteristics with respect to light having a wavelength of 1.55 $\mu m$ (1,550 nm) in two samples each having are fractive index profile of a single-ring structure. In this table, $\Delta n^-$ and $\Delta n^+$ respectively refer to relative refractive index differences of the inner and outer cores with respect to the cladding region which are defined as:

$$\Delta n^- = (n_1^2 - n_{cld}^2)/2n_{cld}^2 \quad (21)$$

$$\Delta n^+ = (n_2^2 - n_{cld}^2)/2n_{cld}^2 \quad (22)$$

wherein $n_1$ is the refractive index of the inner core, $n_2$ is the refractive index of the outer core disposed around the outer periphery of the inner core, and $n_{cld}$ is the refractive index of the cladding region disposed around the outer periphery of the outer core, each of which is expressed in terms of percentage. Also, since the refractive indexes in each equation can be placed in random order, when the relative refractive index difference has a negative value, it means that the refractive index of the corresponding glass region is lower than that of the cladding region. In the case of a refractive index profile of a depressed cladding structure, the above-mentioned reference refractive index $n_{cld}$ is the refractive index of the outer cladding in the cladding region.

In addition, nonlinear refractive index $N_2$ in this table is defined as follows. Namely, refractive index <N> of a medium under strong light varies depending on the optical power. Accordingly, the effect of the minimum-order on this refractive index <N> is:

$$<N> = <N_0> + <N_2> \cdot E^2 \quad (23)$$

wherein

<$N_0$> is a refractive index with respect to linear polarization;

<$N_2$> is a nonlinear refractive index with respect to third-order linear polarization; and E is an optical electric field amplitude.

Under strong light, the refractive index <N> of the medium is given by the sum of the normal value <$N_0$> and an increase which is proportional to the square of optical electric field amplitude E. In particular, the constant of proportion <$N_2$> (unit: $m^2/V^2$) in the second term is called nonlinear refractive index.

FIG. 23 is a graph showing a relationship between the refractive index profile of sample 1 shown in the table of FIG. 22 and its optical power along a radial direction from the center. The value of optical power is standardized with the maximum value taken as 1, and indicated as the optical power is its fundamental mode (LP01) and second-order mode (LP11). Also, each of samples 1 and 2 has a single-ring structure, whereas germanium oxide is added to pure silica glass in the vicinity of the glass part (outer core) where the refractive index is maximized, which is disposed outside the core center (inner core), thus increasing the refractive index. By contrast, in the vicinity of the core center (inner core), pure silica glass is doped with fluorine, so that refractive index is lowered.

With respect to light having a wavelength of 1.55 $\mu m$ (the center wavelength of 1.55-$\mu m$ wavelength band: 1,550 nm), the optical fiber of sample 1 yields an effective core cross-sectional area $A_{eff}$ of 87 $\mu m^2$ and an MFD of 11.2 $\mu m$, thus being capable of reducing the MFD by about 20% as compared with the conventional optical fiber having the equivalent effective core cross-sectional area $A_{eff}$, which yields an MFD of about 13 $\mu m$.

Further, in order to evaluate loss caused by microbend, the inventors wound the dispersion-shifted fiber of sample 1 around a reel having a diameter of 280 mm and a surface provided with sandpaper, and measured fluctuations in loss before and after winding. As a result, it has been confirmed that, while the increase in loss of sample 1 with respect to light having a wavelength of 1.55 $\mu m$ is 0.19 dB/km, the conventional optical fiber yields an increase in loss of 1.12 dB/km, whereby the dispersion-shifted fiber of sample 1 can greatly reduce the increase in loss caused by microbend.

In the dispersion-shifted fiber of sample 2, the position yielding the maximum optical power with respect to light having a wavelength of 1.55 $\mu m$ is separated from the core center by about 3 $\mu m$. For the light having a wavelength of 1.55 $\mu m$, sample 2 has an effective core cross-sectional area $A_{eff}$ of 86 $\mu m^2$ and an MFD of 11.0 $\mu m$. Though the cutoff wavelength $\lambda_c$ at 2 m length in each of samples 1 and 2 is 1.7 $\mu m$, which is longer than the wavelength used (1.55-$\mu m$ wavelength band), both samples would effectively function in a single mode under their normal state of usage, since the single mode is guaranteed at a fiber length of 100 m or more with respect to light having a wavelength of 1.55 $\mu m$.

After the increase in loss by microbend was similarly evaluated in the dispersion-shifted fiber of sample 2, it has been confirmed that its increase in loss is quite small, i.e., 0.11 dB/km. For the light having a wavelength of 1.55 $\mu m$, the wavelength dispersion value of sample 2 is −2.6 ps/mm/ km. That is, the dispersion value at the wavelength used is not zero (zero-dispersion wavelength $\lambda_0$ is shifted to the longer wavelength side than the used wavelength of 1.55 µm). Consequently, the occurrence of four-wave mixing, which causes signals in wavelength multiplexing transmission to deteriorate, is reduced.

Figure 24:
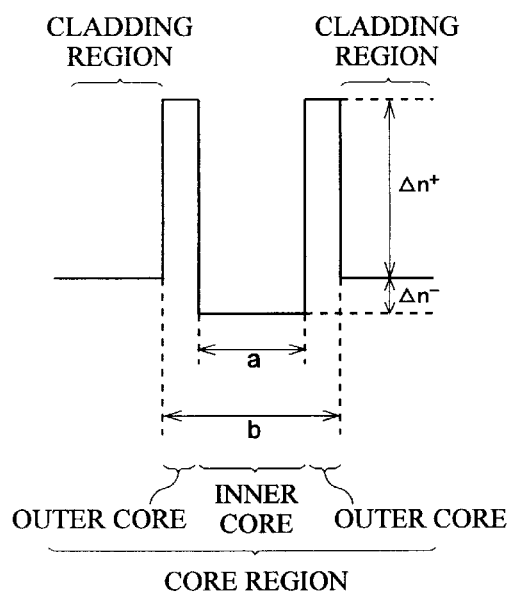
FIGS. 24 to 27 are views showing examples of refractive index profile applicable to the dispersion-shifted fiber according to the present invention.
Figure 25:
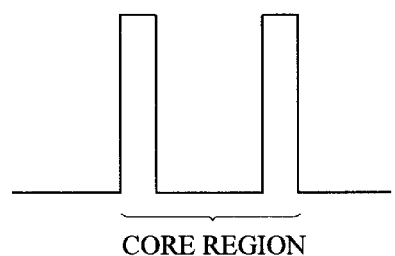
Figure 26:
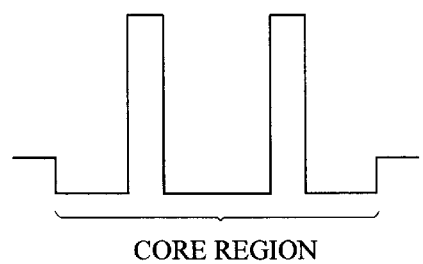
Figure 27:
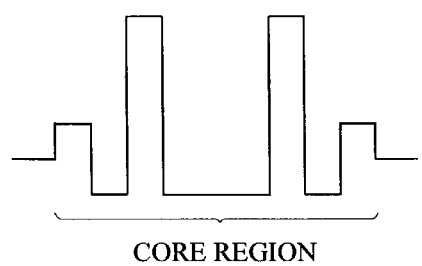

Though each of the above-mentioned samples 1 and 2 has a refractive index profile of a single-ring structure in which the inner core has a refractive index lower than that of the cladding region as shown in FIG. 24, they should not be restricted to this refractive index profile. Namely, the refractive index profile applicable to the dispersion-shifted fiber according to the present invention may be, for example, a structure in which the refractive index of the inner core and that of the cladding region coincide with each other as shown in FIG. 25, a depressed ring structure shown in FIG. 26, or a double-ring structure shown in FIG. 27.

As explained in the foregoing, in the dispersion-shifted fiber according to the present invention, the position where the optical power distribution of signal light in the fundamental mode is maximized is radially separated from the center of the core region by a predetermined distance, while, when the optical power in the fundamental mode of signal light at the center of the core region is $P_0$ and the maximum value of the optical power distribution in the fundamental mode is $P_1$, the maximum value $P_1$ satisfies to be greater than the value of 1.2 times the optical power $P_0$ at the center of core region. Consequently, it can realize a structure in which the effective core cross-sectional area $A_{eff}$ can be increased while keeping the mode field diameter (MFD) small.

In particular, when the position yielding the maximum value of optical power is separated from the center of the core region by 0.5 to 5 µm, the effective core cross-sectional area $A_{eff}$ can be efficiently enhanced.

Further, since the refractive index profile of the dispersion-shifted fiber according to the present invention is designed such that desired values can be obtained as characteristics with respect to light at the center wavelength (1,550 nm) in the 1.55-µm wavelength band, it can effectively restrain nonlinear optical phenomena from occurring.

From the invention thus described, it will be obvious that the implementation of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A dispersion-shifted fiber for propagating signal light in a wavelength band of 1.55 µm, said dispersion-shifted fiber comprising a core region extending along a predetermined reference axis and a cladding region provided around the outer periphery of said core region, said dispersion-shifted fiber having:

a dispersion whose absolute value is from 1.0 to 4.5 ps/nm/km at a center wavelength of said wavelength band of 1.55 µm;

a dispersion slope of 0.05 to 0.09 ps/nm2/km at the center wavelength of said wavelength band of 1.55 µm;

an effective core cross-sectional area not less than 70 µm² at the center wavelength of said wavelength band of 1.55 µm; and a cutoff wavelength not less than 1,300 nm at a fiber length of 2 m, wherein, in a cross section of the fiber perpendicular to a wave-guiding direction thereof, a part of the fiber, where an optical power distribution in the fundamental mode of said signal light or an electromagnetic field distribution accompanied therewith is maximized, lies at a position radially separated from the center of said core region by a predetermined distance, wherein said dispersion-shifted fiber satisfies the following relationship:

$$P_1 > 1.2 \times P_0$$

wherein $P_0$ is an optical power in said fundamental mode at said center of core region, and $P_1$ is a maximum value of said optical power distribution in said fundamental mode.

2. A dispersion-shifted fiber for propagating signal light in a wavelength band of 1.55 µm, said dispersion-shifted fiber comprising a core region extending along a predetermined reference axis and a cladding region provided around the outer periphery of said core region, wherein a position where an optical power distribution in the fundamental mode of said signal light is maximized is radially separated from the center of said core region by a predetermined distance; and wherein said dispersion-shifted fiber satisfies the following relationship:

$$P_1 > 1.2 \times P_0$$

wherein $P_0$ is an optical power in said fundamental mode at said center of core region, and $P_1$ is a maximum value of said optical power distribution in said fundamental mode.

3. A dispersion-shifted fiber according to claim 2, wherein said position where said optical power distribution in said fundamental mode of said signal light is maximized is radially separated from said center of core region by 0.5–5 µm.

4. A dispersion-shifted fiber according to claim 2, wherein said dispersion-shifted fiber has an effective core cross sectional area not less than 70 µm² at a center wavelength of said wavelength band of 1.55 µm.

5. A dispersion-shifted fiber according to claim 2, wherein said dispersion-shifted fiber has a zero-dispersion wavelength set so as to shift from said wavelength band of 1.55 µm.

6. A dispersion-shifted fiber according to claim 2, wherein said dispersion-shifted fiber has:

a dispersion whose absolute value is from 1.0 to 4.5 ps/nm/km at a center wavelength of said wavelength band of 1.55 µm;

a dispersion slope of 0.05 to 0.09 ps/nm²/km at the center wavelength of said wavelength band of 1.55 µm;

an effective core cross-sectional area not less than 70 µm² at the center wavelength of said wavelength band of 1.55 µm; and a cutoff wavelength not less than 1,300 nm at a fiber length of 2 m.

7. A dispersion-shifted fiber according to claim 6, wherein said core region comprises:

an inner core having a first refractive index, and an outer core provided around the outer periphery of said inner core and having a second refractive index higher than said first refractive index; and wherein said cladding region is provided around the outer periphery of said outer core and has a refractive index lower than said second refractive index.

8. A dispersion-shifted fiber according to claim 7, wherein said cladding region comprises:

an inner cladding provided around the outer periphery of said outer core and having a third refractive index lower than said second refractive index; and an outer cladding provided around the outer periphery of said inner cladding and having a fourth refractive index higher than said third refractive index.

* * * * *